United States Patent
Tonchia

(10) Patent No.: US 9,606,253 B2
(45) Date of Patent: Mar. 28, 2017

(54) SEISMIC SOURCE ARRAY CALIBRATION AND SYNCHRONIZATION METHOD, APPARATUS AND SYSTEM

(71) Applicant: CGG SERVICES SA, Massy (FR)

(72) Inventor: Hélène Tonchia, Antony (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/407,266

(22) PCT Filed: Jul. 5, 2013

(86) PCT No.: PCT/EP2013/064317
§ 371 (c)(1),
(2) Date: Dec. 11, 2014

(87) PCT Pub. No.: WO2014/006212
PCT Pub. Date: Jan. 9, 2014

(65) Prior Publication Data
US 2015/0185343 A1    Jul. 2, 2015

Related U.S. Application Data

(60) Provisional application No. 61/668,657, filed on Jul. 6, 2012.

(51) Int. Cl.
*G01V 1/38*    (2006.01)
*G01V 1/28*    (2006.01)
(Continued)

(52) U.S. Cl.
CPC ............... *G01V 1/28* (2013.01); *G01V 1/186* (2013.01); *G01V 1/26* (2013.01); *G01V 1/38* (2013.01);
(Continued)

(58) Field of Classification Search
CPC ........ G01V 1/3861; G01V 1/186; G01V 1/28; G01V 1/38; G01V 1/26; G01V 2210/1212
(Continued)

(56) References Cited

U.S. PATENT DOCUMENTS 3,361,979 A * 1/1968 Luttik ....................... G01J 1/46
                                                        327/14
4,047,591 A   9/1977 Ward et al.
(Continued)

FOREIGN PATENT DOCUMENTS

GB    2445842 A    7/2008

OTHER PUBLICATIONS

P.M. Krail, "Airguns: Theory and operation of the marine seismic source", Course notes for GEO-391, Principles of seismic data acquisition, 2010, pp. 1-44, University of Texas.
(Continued)

*Primary Examiner* — Daniel L Murphy
(74) *Attorney, Agent, or Firm* — Patent Portfolio Builders PLLC

(57) ABSTRACT

Method, apparatus and system for calibrating and synchronizing a seismic acoustic source array (50) by taking into account both a time-break signal (500) and a near-field signal (504). A time delay between the time-break signal and the near-field signal is used to calculate an offset for adjusting the shooting of the source elements of the source array.

19 Claims, 24 Drawing Sheets

(51) Int. Cl.
*G01V 1/18* (2006.01)
*G01V 1/26* (2006.01)

(52) U.S. Cl.
CPC .... *G01V 1/3861* (2013.01); *G01V 2210/1212* (2013.01)

(58) Field of Classification Search
USPC ..................................................... 367/21, 23
See application file for complete search history.

(56) References Cited

U.S. PATENT DOCUMENTS

| | | | |
|---|---|---|---|
| 4,648,080 | A | 3/1987 | Hargreaves |
| 4,960,183 | A | 10/1990 | Young, II |
| 5,184,329 | A | 2/1993 | Regnault et al. |
| 6,788,618 | B2 | 9/2004 | Clayton et al. |
| 7,974,150 | B2 | 7/2011 | Tulett et al. |
| 8,154,956 | B2 | 4/2012 | Ward |
| 8,174,927 | B2 | 5/2012 | Hopperstad et al. |
| 2004/0228214 | A1 | 11/2004 | Tulett |
| 2010/0149911 | A1 | 6/2010 | Hopperstad et al. |
| 2011/0063947 | A1* | 3/2011 | Norris .................. G01V 1/3808 367/21 |
| 2012/0287752 | A1 | 11/2012 | Payen et al. |
| 2016/0003957 | A1* | 1/2016 | Norris ...................... G01V 1/38 367/24 |

OTHER PUBLICATIONS

A. Ziolkowski, "The determination of the far-field signature of an interacting array of marine seismic sources from near-field measurements—results from the Delft Air Gun Experiment", first break, Feb. 2007, pp. 88-102, vol. 25.

A. Ziolkowski et al., "Marine seismic sources: QC of wavefield computation from near-field pressure measurements", Geophysical Prospecting, 1997, pp. 611-639, vol. 45.

Office Action in corresponding European Application No. 13 737 575.4 dated Jun. 19, 2015. (Reference previously submitted with IDS on July 289, 2015).

International Search Report mailed Aug. 11, 2014, in related International Application No. PCT/EP2013/064317.

Written Opinion of the International Search Authority mailed Aug. 11, 2014, in related International Application No. PCT/EP2013/064317.

Office Action in corresponding European Application No. 13 737 575.4 dated Apr. 12, 2015. (Reference D1 was submitted with an Information Disclosure Statement dated Dec. 11, 2014.).

Examination Report in corresponding Australian Application No. 2013285350 dated Sep. 15, 2016. (Reference D1 was submitted in an Information Disclosure Statement on Jul. 28, 2015.).

* cited by examiner

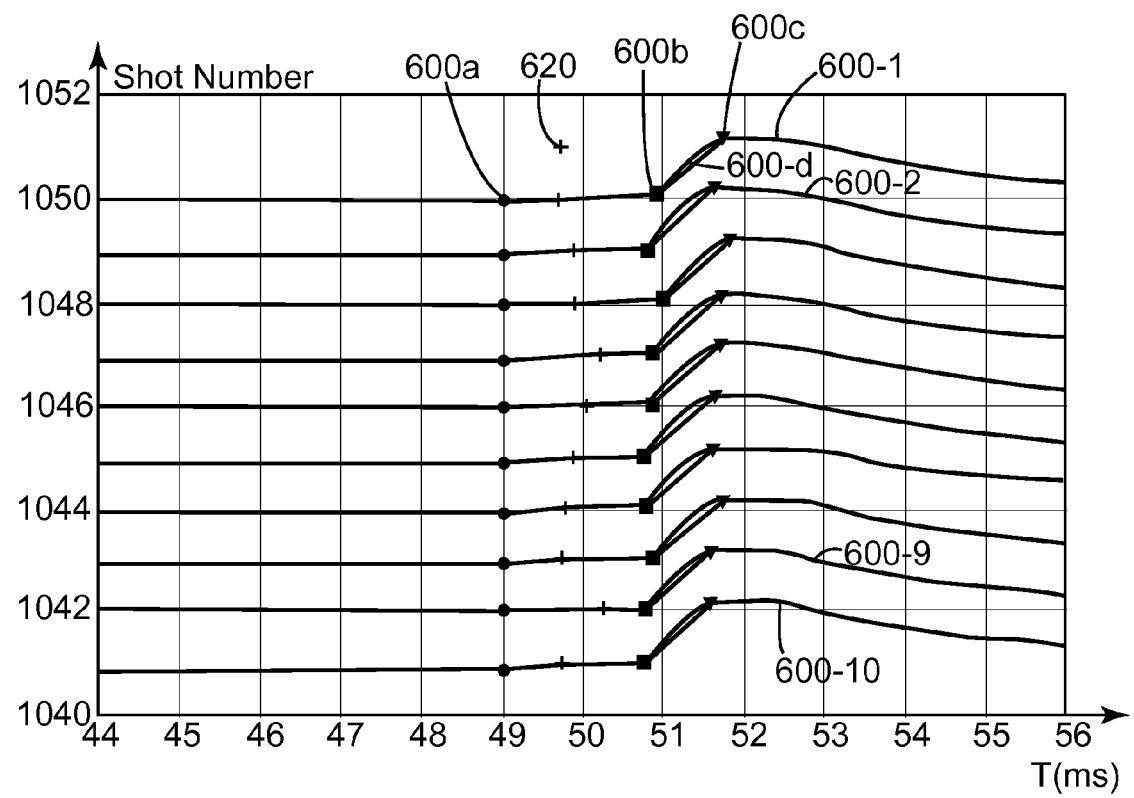

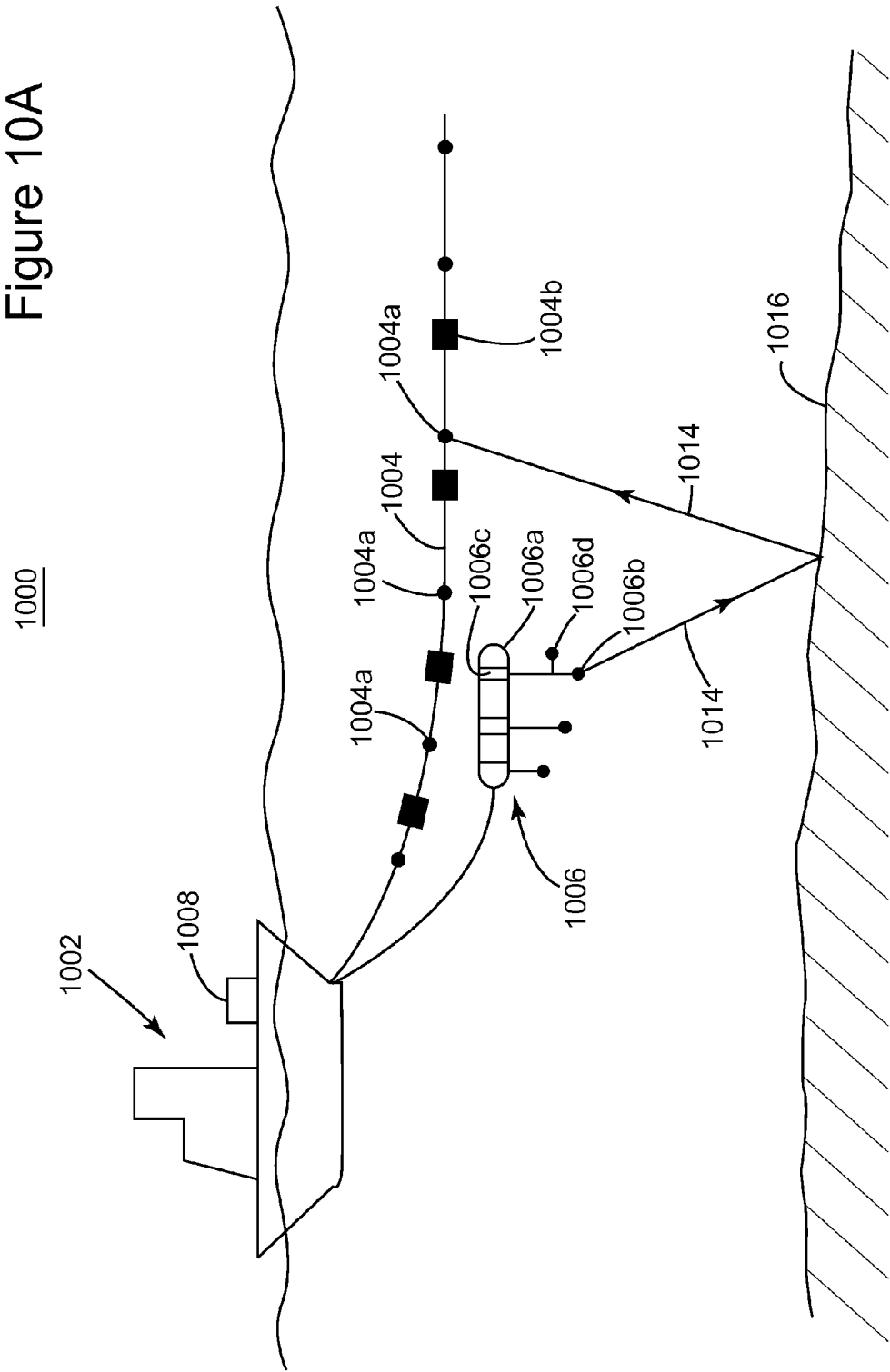

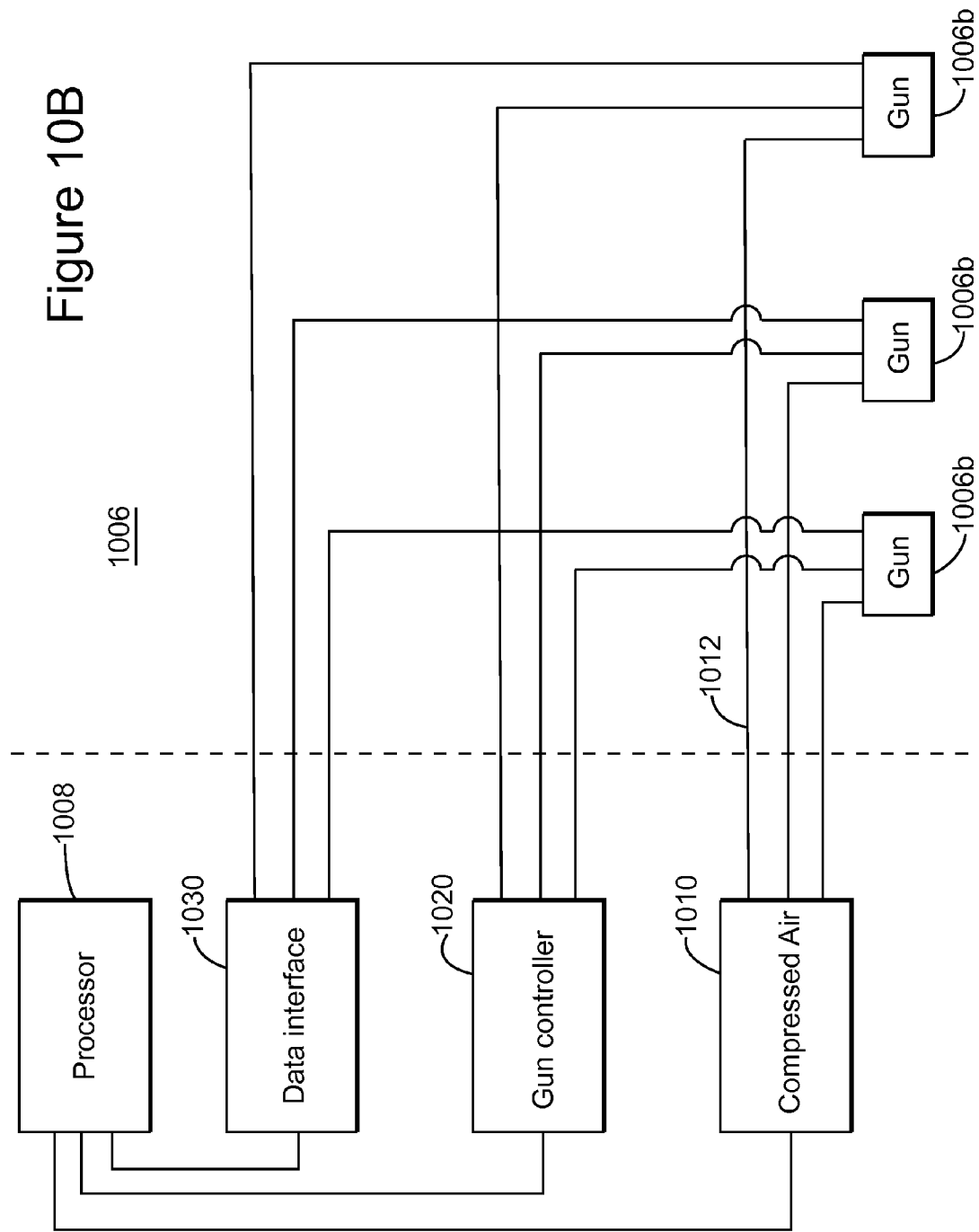

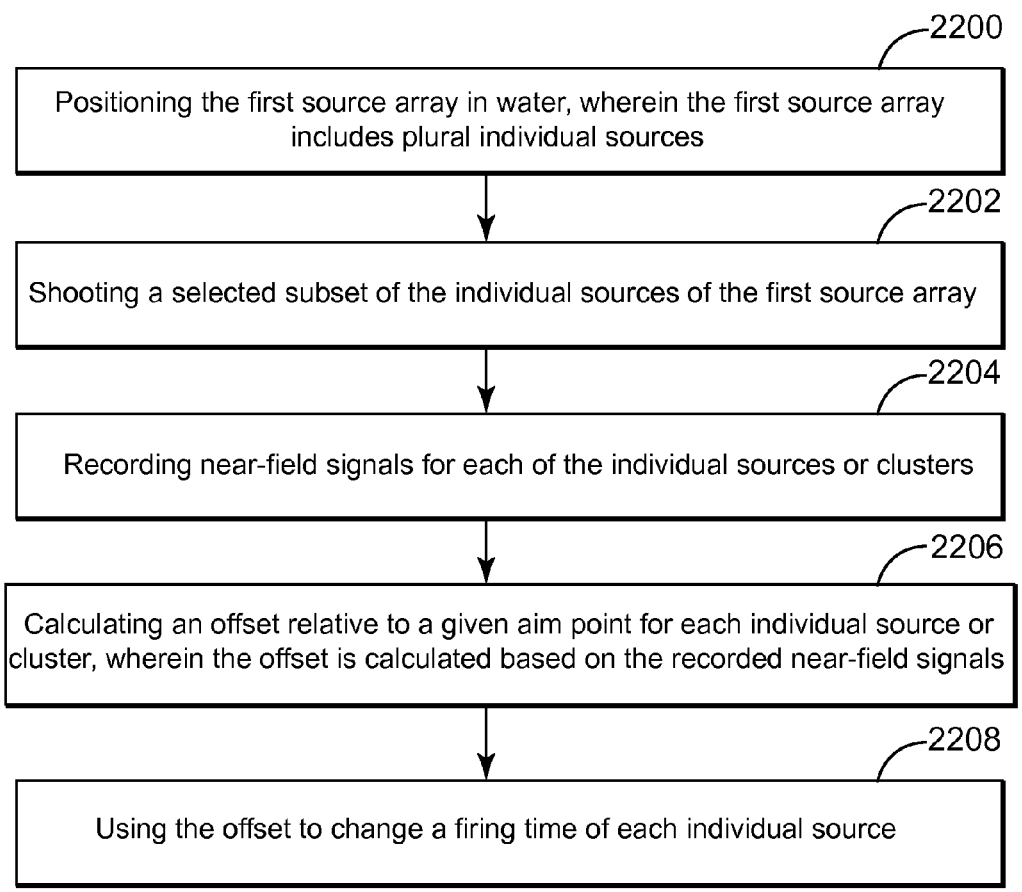

SEISMIC SOURCE ARRAY CALIBRATION AND SYNCHRONIZATION METHOD, APPARATUS AND SYSTEM

BACKGROUND

Technical Field

Embodiments of the subject matter disclosed herein generally relate to methods and systems related to seismic exploration and, more particularly, to mechanisms and techniques for synchronizing seismic source arrays.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, improving the resolution of images of the structures under the seafloor is an ongoing process.

During a seismic gathering process, as shown in FIG. 1, a vessel 10 may tow an array of seismic receivers 11 provided on streamers 12. The streamers may be disposed horizontally, i.e., lying at a constant depth relative to a surface 14 of the ocean or other body of water, or have spatial arrangements other than horizontal, such as at variable depths. The vessel 10 may also tow a seismic source array 16 configured to generate a seismic wave 18. The seismic wave 18 propagates downward, toward the seafloor 20, and penetrates the seafloor until, eventually, a reflecting structure 22 (reflector) reflects the seismic wave. The reflected seismic wave 24 propagates upward until it is detected by the receiver 11 on streamer 12. Based on this data, an image of the subsurface is generated.

In an effort to improve the resolution of the subsurface's image, an innovative solution (BroadSeis system of CGG, Massy, France) has been implemented based on broadband seismic data. The BroadSeis system may use Sentinel streamers (produced by Sercel, Nantes, France) with low noise characteristics and the ability to deploy in configurations that enable recording of an extra octave or more of low frequencies. The streamers are designed to record seismic data while being towed at greater depths and are quieter than other streamers. Thus, the receivers of these streamers would benefit from a marine broadband source array.

Such a source array that has a number of superior characteristics than existing source arrays is disclosed in patent application Ser. No. 13/468,589, filed on May 10, 2012, and assigned to the same assignee as the present application, the entire disclosure of which is incorporated herein by reference. This source array is illustrated in FIG. 2 as source array 50. The source array 50 may include multiple sub-arrays 60a-c, each having a corresponding float 52a-c. A plurality of source points 64 may be suspended from each float 52. However, different from existing sources, note that the source points 64 are suspended, from the same float, at two or more depths, and the configuration of the source points attached to one float may be different from the configuration of the source points attached to another float. For example, FIG. 2 shows that sub-array 60a has the higher depth source point behind the shallow source points along the direction Y, while the sub-array 60c has the higher depth source point between the shallow source points along the Y direction.

A source point of a source array may be an air gun or a cluster of air guns. An air gun stores compressed air and releases it suddenly underwater when fired. The released air forms a bubble (which may be considered spherical), with air pressure inside the bubble initially greatly exceeding the hydrostatic pressure in the surrounding water. The bubble expands, displacing the water and causing a pressure disturbance that travels through the water. As the bubble expands, the pressure decreases, eventually becoming lower than the hydrostatic pressure. When the pressure becomes lower than the hydrostatic pressure, the bubble begins to contract until the pressure inside again becomes greater than the hydrostatic pressure. The process of expansion and contraction may continue through many cycles, thereby generating a pressure (i.e., seismic) wave. The pressure variation generated in the water by a single source point, which is measured using a hydrophone or geophone located near the air gun as a function of time, is called the near-field signature and is illustrated in FIG. 3. A first pressure increase due to the released air is called primary pulse and it is followed by a pressure drop known as a ghost. Between highest primary pressure and lowest ghost pressure is a peak pressure variation (P-P). The pulses following the primary and the ghost are known as a bubble pulse train. The pressure difference between the second pair of high and low pressures is a bubble pressure variation $P_b$-$P_b$. The time T between pulses is the bubble period.

Single air guns are not practical because they do not produce enough energy to penetrate at desired depths under the seafloor, and plural weak oscillations (i.e., the bubble pulse train) following the primary (first) pulse complicates seismic data processing. These problems may be overcome by using arrays of air guns (i.e., a source array), generating a larger amplitude primary pulse and canceling secondary individual pulses by destructive interference.

A source array includes plural individual sources, as already discussed with regard to FIG. 2. Since the dimensions of the source array, including plural individual sources, are comparable with the generated wave's wavelength, the overall wave the source generates is directional, i.e., the shape of the wave, or its signature, varies with the direction until, at a great enough distance, the wave starts having a stable shape. After the shape become stable, the amplitude of the wave decreases inversely proportional with the distance. The region where the signature shape no longer changes significantly with distance is known as the "far-field," in contrast to the "near-field" region where the shape varies. The far-field signature is an important quantity for the processing stage and, thus, it is desirable to know as accurately as possible its value.

The far-field signature has contributions from each individual source of the source array. To have a good far-field signature, it is desired that the primaries from each individual source arrive at a given far point, on a vertical below the source array, at the same time, i.e., they undergo constructive interference while the secondaries undergo destructive interference. If this condition is achieved, the far-field signature is of good quality. To achieve this far-field signature, the individual sources in the source array need to be synchronized, i.e., fired at such times that their primaries constructively interfere at the far point. The synchronization takes care of the different locations of the individual sources, sizes, types, volumes, age and maintenance conditions.

One such synchronization is disclosed in U.S. Pat. No. 8,174,927 (herein the "'927 reference"), the entire content of which is incorporated herein by reference. The '927 reference discloses using notional signatures of each individual source for aligning the firing of the source array. Further, the '927 reference discloses using the notional signatures with an attribute of the source for synchronizing the source array.

However, traditional methods assume that the source wavelet is constant for all shots in a survey (and from one survey to the next). This assumption can be invalid, especially when minor perturbations in wave height, gun pressure, array geometry and dropouts are present, which means that the true source signature varies from shot to shot.

Further, the stability and reliability of the far-field signature depends on the stability of each of the individual sources and of the source array's geometry. During a seismic survey, the individual sources' behavior may change (e.g., firing later or earlier than expected, than desirable, or at a smaller amplitude than nominally designed) and thus affect the far-field source signature. In practice, the gun controllers rely on a sensor called time-break (hereby called TB) installed inside each air-gun body to monitor the launch of each gun. However, for guns of different sizes, different models and/or different service time and maintenance conditions, the delay between the launch (electrical signal sent to gun and valve begins to open) and the actual shot (air goes out of the gun body and begins to generate the seismic wave) may vary.

Thus, despite the advances made by the seismic sources described above, calibrating and synchronizing seismic sources, particularly clusters of seismic sources, remains a challenge.

SUMMARY

According to one embodiment, a method for quality control of a first source array for a seismic survey includes towing the first source array in water, wherein the reference source array includes plural individual sources; shooting at least one of the individual sources of the first source array; receiving a time-break signal associated with a given individual source; recording a near-field signal associated with the given individual source; and calculating a time delay between the time-break signal and the near-field signal for the given individual source.

According to another embodiment, there is a method for seismic surveying that includes towing a source array in the water, the source array including at least a source element having a time-break sensor and a near-field sensor; shooting selected source elements of the source array at a given time; determining, for the at least a source element, an offset between a time-break signal recorded by the time-break sensor and a near-field signal recorded by the near-field sensor; and determining that there is a malfunction in the at least a source element based on a variation in the offset between the time-break signal and the near-field signal.

According to yet another embodiment, there is a method for seismic surveying that includes towing a source array in water, wherein the source array includes at least one source element having a near-field sensor; shooting selected source elements of the source array at first and second times; determining a difference between each near-field signal recorded at the first time and a corresponding near-field signal recorded at the second time with a same near-field sensor, wherein the difference is calculated after aligning the near-field signals, recorded at the first and second times, at their start of slope point, before adjacent source elements signals reach the near-field sensor; and determining a fault in the source array if the difference exceeds a given threshold.

According to another embodiment, there is a method of seismic surveying that includes towing a source array in water, wherein the source array includes at least one source element having a near-field sensor; shooting selected source elements of the source array at a given time; recording a near-field signal with the near-field sensor; identifying whether there is a significant dip in the near-field signal, after a start of a slope of the near-field signal; and determining a fault in the source array if the dip exceeds a given threshold within a given offset from the start of the slope of the near-field signal.

According to another embodiment, there is a method for acquiring and processing broadband data. The method includes receiving seismic data from different acquisition depths, wherein the seismic data is generated with a source array having first and second source elements located at different depths; determining time delays for each source element of the source array, wherein the time delays are calculated based on recorded near-field signals and at least one aim point; calculating a source signature based on the time delays and an attribute of the source array; and processing the seismic data using the source signature.

According to still another embodiment, there is a method for performing a repeated marine seismic survey line. The method includes obtaining current offsets of each source element of the source array for a base line; determining new offsets to apply to each of the source elements of a new source array during a new survey to match the base line; and shooting the survey line by positioning the new source array in the water, applying the new offsets to each source element of the new source, and firing the new source.

According to another embodiment, there is a method for optimizing a first source array's synchronization for a seismic survey. The method includes positioning the first source array in water, wherein the first source array includes plural individual sources; shooting the individual sources of the first source array one by one; recording near-field signals for each of the individual sources when the individual sources are shot one by one; calculating an offset relative to a given aim point for each individual source, wherein the offset is calculated based on the recorded near-field signals; and sending the offset to a gun controller that controls the source array, wherein the gun controller controls the shooting of each individual source.

According to another exemplary embodiment, there is a method for optimizing a first source array's synchronization for a seismic survey. The method includes positioning the first source array in water, wherein the first source array includes plural individual sources; shooting a selected subset of the individual sources of the first source array; recording near-field signals for each of the individual sources or clusters; calculating an offset relative to a given aim point for each individual source or cluster, wherein the offset is calculated based on the recorded near-field signals; and using the offset to change a firing time of each individual source.

According to still another embodiment, there is a seismic surveying system for acquiring broad band data. The system includes a vessel towing a multi-level source array, wherein each individual source element or cluster has a determined shooting aim point relative to others; a gun controller for controlling the multi-level source array; near-field sensors associated with the individual source elements or clusters of the source array; and plural hydrophones and multi-component sensors towed at different depths. The near-field signals recorded by the near-field sensors are processed to determine offsets between the individual sources or clusters and their aim points, and the offsets are used by the gun controller to ensure that when a time-break deviation is null, the individual sources or clusters are shooting at their given determined aim point.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 illustrates plural near-field signals recorded for a single source according to an embodiment;

FIG. 10A illustrates a seismic survey system having a multi-level source array according to an embodiment;

FIG. 10B is a schematic diagram illustrating the locations of various elements of a source array according to an embodiment;

FIG. 22 is a flow-chart of a method for adjusting a firing time of a source array according to an exemplary embodiment.

DETAILED DESCRIPTION

The following description of particular embodiments refers to the accompanying drawings. The same reference numbers in different drawings identify the same or similar elements. The following detailed description does not limit the invention to the particular embodiments disclosed herein. Instead, the scope of the invention is defined by the appended claims. The following embodiments are discussed, for simplicity, with regard to the terminology and structure of a source array having plural air guns.

Reference throughout the specification to "one embodiment" or "an embodiment" means that a particular feature, structure or characteristic described in connection with an embodiment is included in at least one embodiment of the subject matter disclosed. Thus, the appearance of the phrases "one embodiment," "some embodiments," "certain embodiments" or "an embodiment" in various places throughout the specification is not necessarily referring to the same embodiment or collection of embodiments. Further, the particular features, structures or characteristics may be combined in any suitable manner in one or more embodiments.

Emerging technologies in marine seismic surveys require new sources that are multilevel and their signatures need to be better controlled. This can be achieved by controlling the firing time of each individual source that make the source array. As discussed in the Background section, the existing source arrays use the TB signal (the time break signal is indicative of the opening of the gun and it is recorded by using, for example, a fluid pressure sensor located inside or outside the gun; an attribute of the time break signal is used for indicating the opening of the gun; this attribute may be one of a signal maximum amplitude, time of threshold, zero-crossing or other suitable parameter associated with the signal) or the near-field (NF) signal (this signal is indicative of an attribute of the gun, for example, the sound pressure made by the gun) to determine when to fire the individual sources. Thus, information related to the TB and NF signals is presently recorded by the source array's controller. Based on the TB signal, the controller may determine the time break. However, existing methods do not correlate these two signals which, as discussed later, may result in superior calibration and quality control of the source array.

Figure 1:
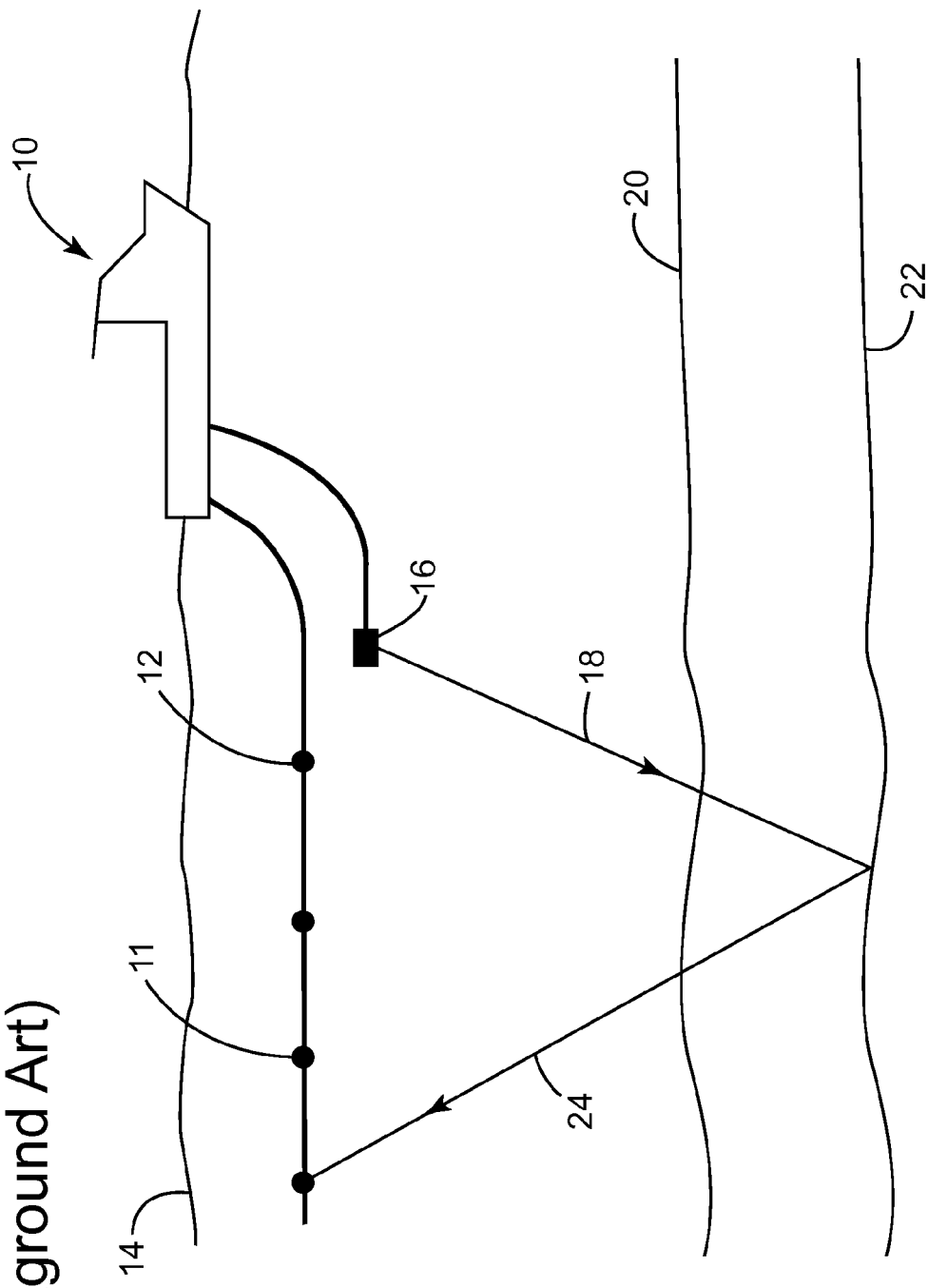
FIG. 1 is a schematic diagram of a conventional seismic survey system.
Figure 2:
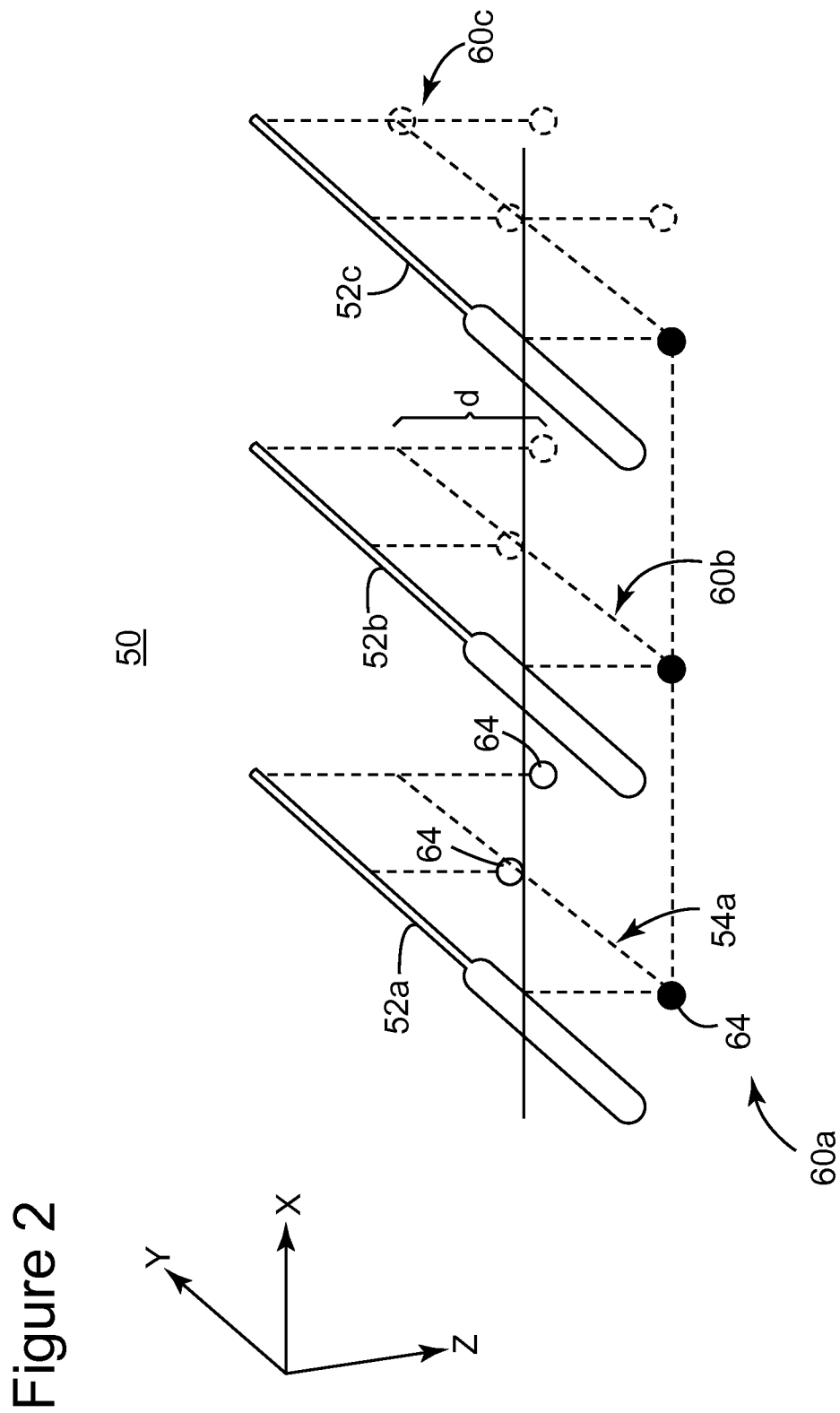
FIG. 2 is an overall view of a source array having plural floats, each having two sets of sources distributed at two different depths according to one embodiment.
Figure 3:
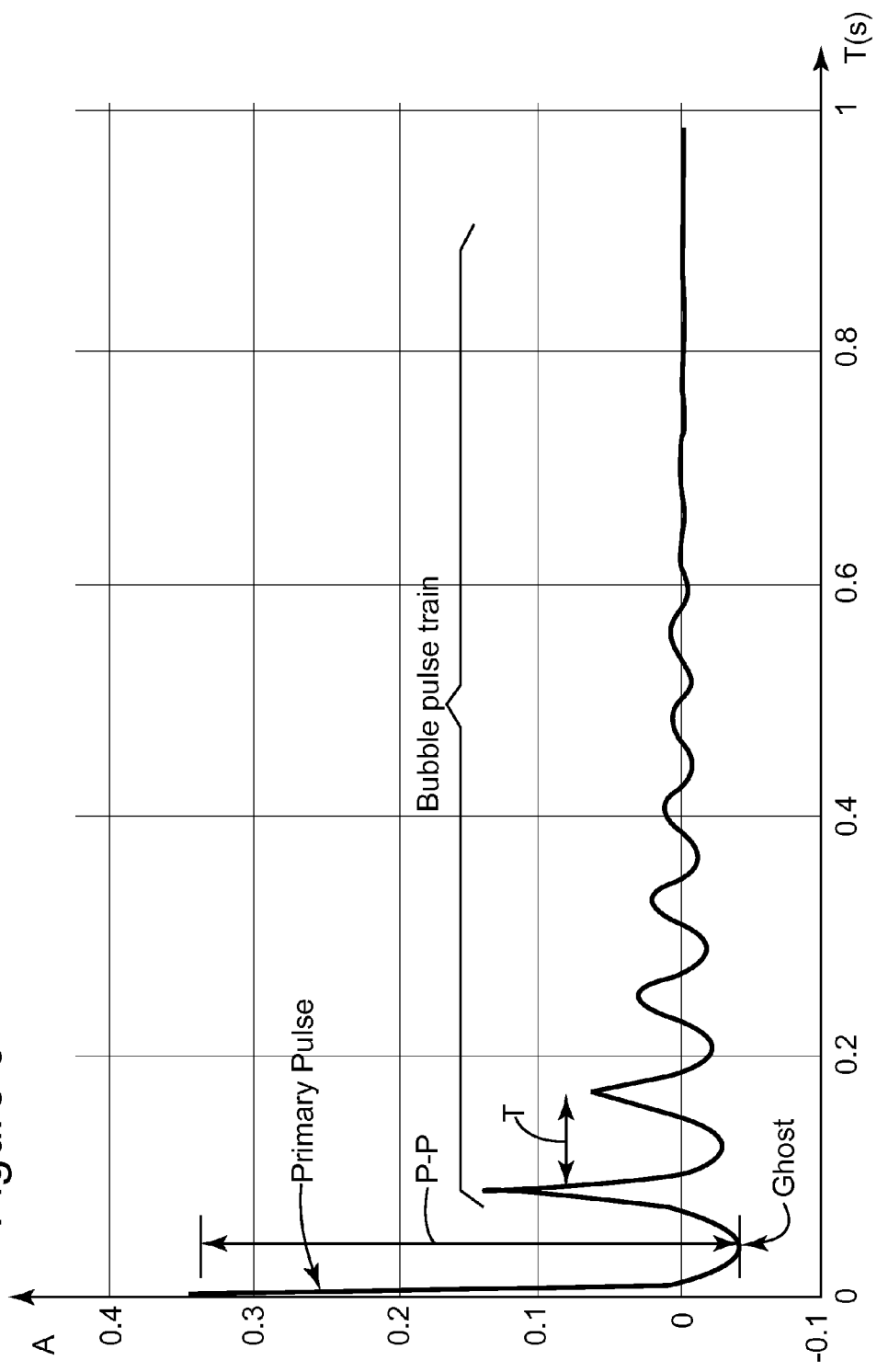
FIG. 3 is a graph representing a pressure amplitude versus time for a source bubble test.
Figure 4A:
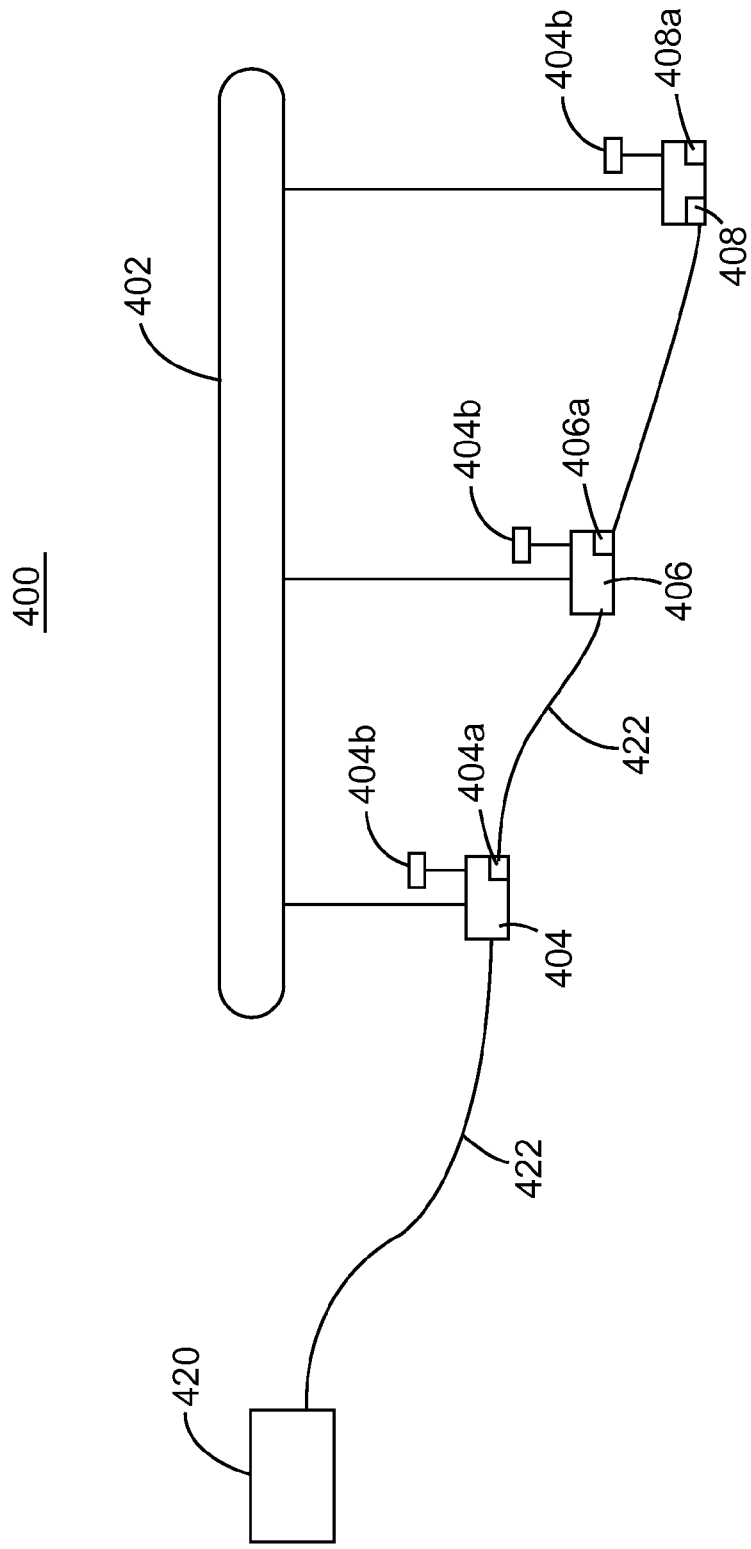
FIGS. 4A-B illustrate a multi-level source and accompanying sensors according to an embodiment.

Prior to discussing the novel aspects, a multilevel source array is described with reference to FIG. 4A, and it includes one or more source sub-arrays. FIG. 4A shows a source sub-array 400 that includes a float 402 from which individual sources 404, 406 and 408 are suspended at various levels. The number of independent sources is for illustration only. Each independent source may include a corresponding time-break sensor 404a, 406a and 408a, respectively, and a near-field sensor (e.g., hydrophone) 404b, 406b and 408b, respectively. The near-field sensor may be located above or below the individual source, but close to it.

Figure 4B:
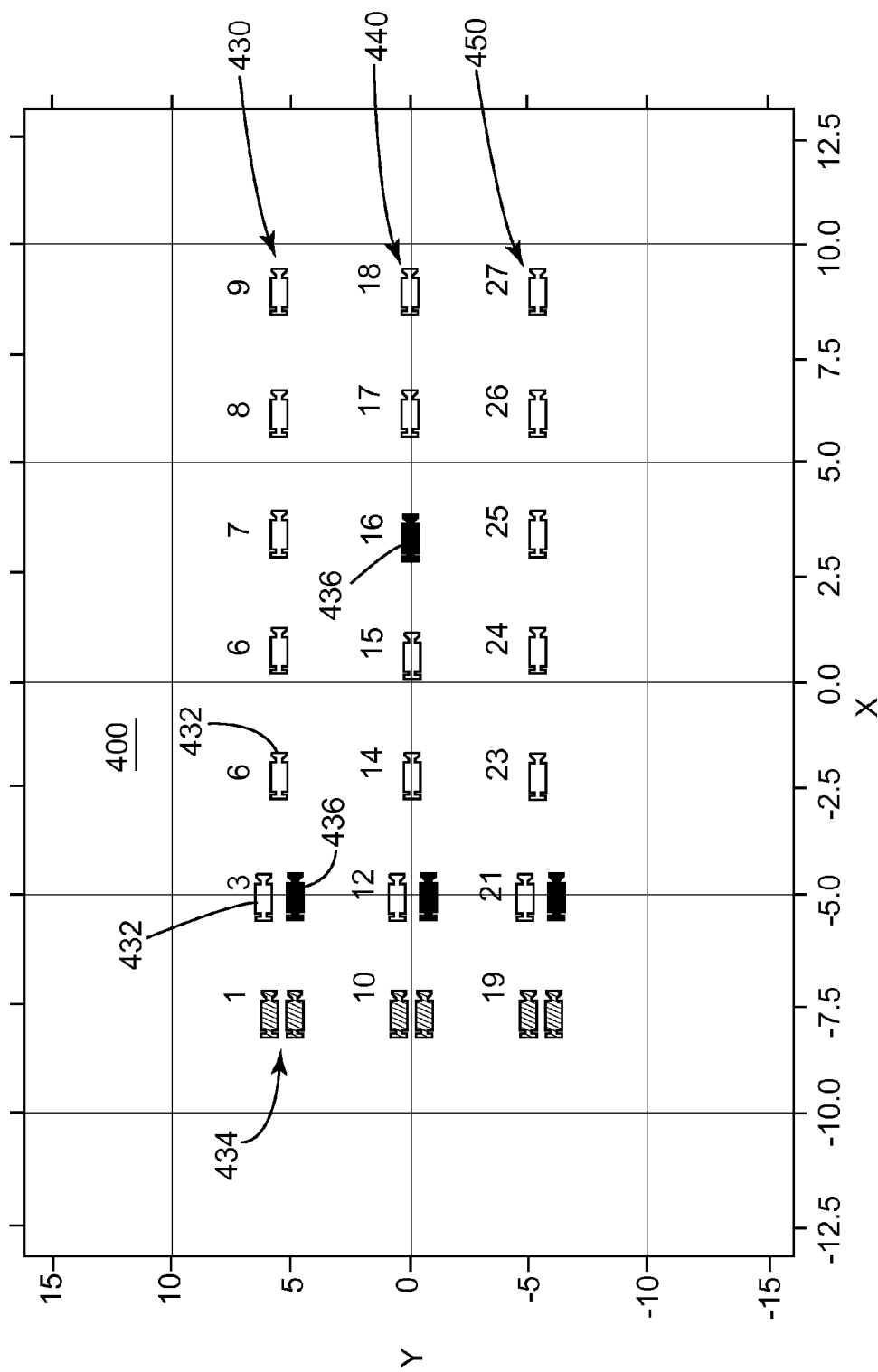

The embodiment illustrated in FIG. 4A shows the individual sources 404, 406 and 408 being distributed along a slanted line. This specific arrangement is used just to illustrate a multilevel source and not to limit the applicability of the novel methods. Those skilled in the art would appreciate that other arrangements for the individual sources are possible, e.g., a curved line, not only the traditional arrangement that has all the individual sources distributed along a horizontal line. Further, not all elements of the source array need to be individual sources. For example, as illustrated in FIG. 4B, the source array 400 may include three sub-arrays 430, 440 and 450, each including a variety of elements such as an individual source 432, a cluster source 434 (which is nothing else that two or more individual sources clustered together), etc. From an actuation point of view, an individual source may be active (i.e., triggered repeatedly during the seismic survey) as individual source 432 or it may be a spare source 436 (i.e., triggered only at certain times or when another individual source fails). Thus, when the expression "a source array is fired" is used, it means that at least a subset of the individual sources are fired. A gun controller 420 may be linked through corresponding electrical cables 422 (which are part of the umbilical that connects the towing vessel to the seismic source array) and effectively triggers each individual source. Gun controller 420 may be located on the towing vessel or distributed between the towing vessel and the seismic source array, and communicates with the time-break sensors and near-field sensors.

For aligning the shooting of the individual sources in a source array, traditional methods are using either the time-break signals or the near-field signals for determining an offset for the guns, and the gun controller applies this offset to each individual source. According to an embodiment, a delay between the time-break signal and the near-field signal is used to synchronize the individual sources (i.e., the guns). The terms "individual source" and "gun" are used herein interchangeably with the understanding that an individual source is a broader term than the gun, and the individual source may include one or more guns or other types of wave-generating devices. The delay between the time-break signal and the near-field signal is gun-dependent and varies in time and with the maintenance of the gun. Note that for the following embodiments, quality control (QC) data is used to synchronize the source array, or to match source arrays, or to determine when maintenance is necessary, etc. QC data includes recorded near-field and time-break signals.

Figure 5A:
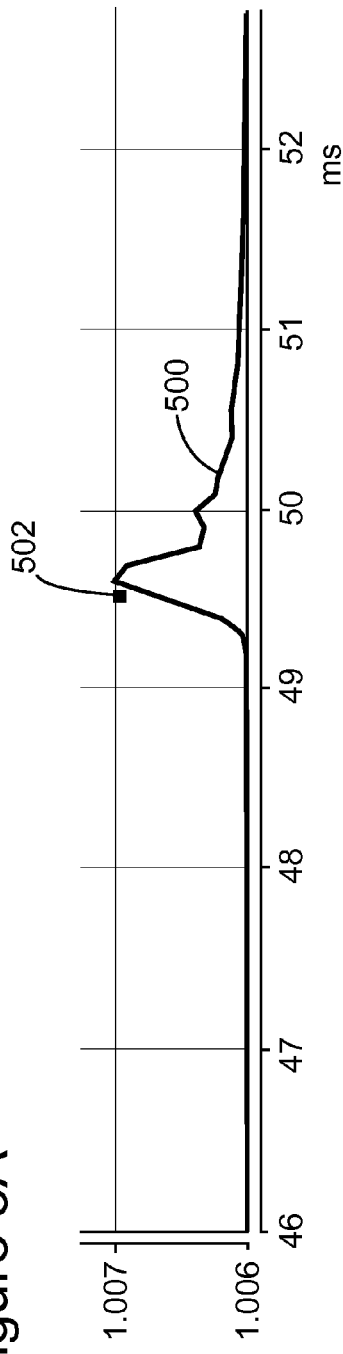
FIGS. 5A-B illustrate a near-field signal and a time-break signal for a seismic source.
Figure 5B:
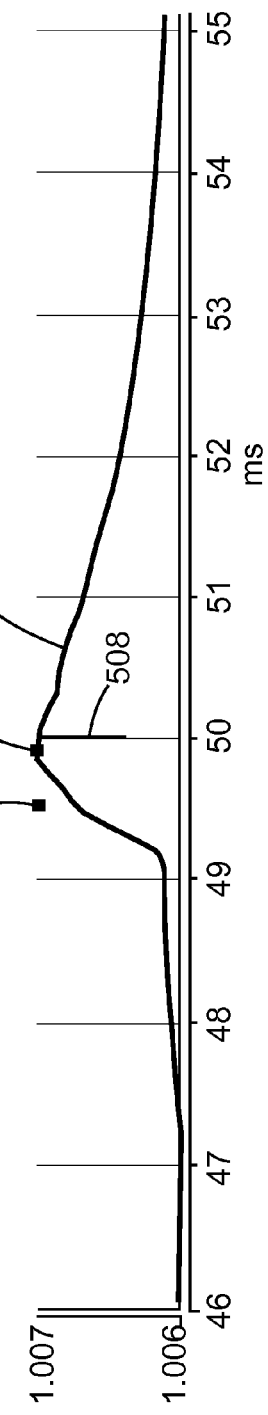

For illustrative purposes, a time-break signal 500 and a time-break point 502 are illustrated in FIG. 5A. The time-break point 502 is provided by the gun controller, and it may represent various attributes of the individual source. For example, the gun controller may monitor voltage or current of the individual source and extract the time-break point from such attribute. The novel methods discussed herein apply to any time-break signal. The near-field signal 504 is typically recorded by a hydrophone and, thus, it records a change in pressure over time as illustrated in FIG. 5B. A maximum 506 of the near-field signal 504 may be considered indicative of the firing of the source, and this quantity is monitored relative to an aim point represented by line 508. In other words, for the individual source monitored in FIGS. 5A and 5B, it is desired to fire the source at 50 ms (508). However, both the time-break point 502 and the near-field signal maximum 506 are earlier than the desired aim point 508.

Thus, according to an embodiment, a time delay between the time-break point 502 and the near-field signal maximum 506 is determined and used to synchronize the entire source array. Note that the time delay may be corrected with a travel time of an acoustic wave that propagates from (i) a given individual source to (ii) a corresponding near-field sensor. This time delay may be used by the gun controller to shoot a given individual source later or sooner relative to a previous shooting time. This time delay may be calculated for and applied to each individual source.

The time delay between the time-break signal and the near-field signal may also be used to compute an offset for an individual source in a first source array and to determine the offset to be used for a new, second source, to "match" the first source when a four-dimensional (4D) survey is performed. For a 4D survey, a baseline survey (first survey) is performed with a given source over a given subsurface. Later in time, it is desired to repeat the same survey to determine, for example, reservoir changes in the subsurface. The following (second) survey may use the same or a different source. However, it is desired to shoot the new source similarly to the first source.

Thus, according to this embodiment, it is possible to use the delays between the time-break signal and the near-field signal to calculate a statistical difference between the first source array used for the baseline survey and the actual source used during the next survey. One example for calculating the statistical difference is using an existing software tool (e.g., Nucleus, produced by PGS, Norway) for determining a far field signature of the source array and adjusting the time delays until the signature of the source used in the base survey is nearly identical to the signature of the source used in the next survey. Using the statistical difference, it is possible to determine the offsets to be used in the second source to best match the baseline source. Thus, a 4D matched sourced may be achieved.

More specifically, an embodiment may use information related to the first source array, e.g., description of the guns positions, volumes, etc, the TB attributes if those have been recorded, NF signals and possibly distances from NF sensors to corresponding gun openings for determining its far-field signature. The statistical difference noted above may be implemented as the mean value, i.e., computing the delays between the NF and TB signals for each gun for each shot for the baseline source. Then a rolling mean should be fairly constant except when there are jumps due to any reason, e.g., air leak. A rolling mean or moving average is a type of finite impulse response filter used to analyze a set of data points by creating a series of averages of different subsets of the full data set. For example, given a series of numbers and a fixed subset size, the first element of the moving average is obtained by taking the average of the initial fixed subset of the number series. Then the subset is modified by "shifting forward," i.e., excluding the first number of the series and including the next number following the original subset in the series. This creates a new subset of numbers, which is averaged. This process is repeated over the entire data series. The plot line connecting all the (fixed) averages is the moving average. A moving average is a set of numbers, each of which is the average of the corresponding subset of a larger set of datum points. A moving average may also use unequal weights for each datum value in the subset to emphasize particular values in the subset.

Thus, according to this embodiment, an offset value for each gun statistically representative of the NF/TB delay is chosen during the baseline survey, e.g. the mean value or a set of values if there are some significant jumps. Then, the new source is synchronized so as to obtain the previously calculated delays. In one application, it could be one value for a survey, or one value for a line or a portion of a line. This method may be applied to a broadband survey, or a broadband survey with a broadsource as the firing delays are likely to change the high frequency content of the source.

According to another embodiment, a mean signature is determined for the source array. The mean signature assumes that the time-break signals are aligned with the aim point. Because the guns are mechanical devices, the delay between the firing order and the actual shooting varies with the shot point. The variation is usually less than 2 ms. When a gun is shooting at a given time, the TB is an indication of when the gun is shooting. However, there is usually an offset between the TB and when the gun is actually shooting (usually pressure peak). In other words, if the gun was shooting with a constant delay between the firing order and the TB, the TB would be at the aim point. In practice, the TB is sometime before and sometime after the aim point. However, the gun is actually firing at different times than the TB. The mean signature is the signature corresponding to all the guns in a source array having their TB aligned with the aim point and each of the guns actually shooting at different offsets to this aim point.

Such mean signature is later used to deconvolve the seismic data recorded during the seismic survey. Assuming the time-break signals are aligned with the aim point, the mean signature is computed based on the delays between the time-break signal and the near-field signal. This signature can be used when the time delays between the time-break signal and the near-field signal stay within a given limit (for example 0.2 ms). The time delay between the time-break signal and the near-field signal may be checked after each individual source's maintenance or at regular intervals. In one application, a bubble test procedure is used to determine the time delays between the time-break signal and the near-field signal, i.e., each individual source may be shot prior to the seismic survey, and the time-break signal and the near-field signal are recorded without being influenced by other individual sources.

When the time delays between the time-break signal and the near-field signal change by more than a given limit, a new signature is computed. Also, the sensors recording the time-break signal and the near-field signal may be checked when the time delays are more than the given limit. The given limit depends on the type of individual source, its age, size, maintenance, etc.

In another embodiment, instead of using only the time-break signal for synchronizing the source array, the time delays between the time-break signal and the near-field signal are used for synchronization (i.e., source calibration). For example, the time delays at the start of the survey and/or at any other time during the survey may be used as offsets in the gun controller to make the guns statistically fire at the aim point.

In another embodiment, the firing time is considered the maximum of the near-field signal, i.e., point 506 in FIG. 5 on the near-field signal 504. However, for some existing gun controllers, experience shows that this maximum 506 is not the best indicator for firing time because, among other reasons, sometimes there is no clear maximum. According to this embodiment, the start of the near-field signal and/or the start of the slope of the near-field signals are better indicators. In this regard, FIG. 6 shows ten different near-field signals 600-1 to 600-10 recorded for a same individual source (e.g., an air gun) during a bubble test. For simplicity, only the first near-field signal 600-1 is analyzed herein. Note that the near-fields signal 600-1 is substantially zero until time 49 ms, and then it starts increasing. Point 600a (circle) defines the start of the near-field signal. Then, the signal starts to dramatically increase at point 600b (square) until it achieves a maximum value 600c (triangle). Point 600b corresponds to the start of the slope 600d of the near-field signal. Also illustrated is the time-break point 620.

Figure 7:
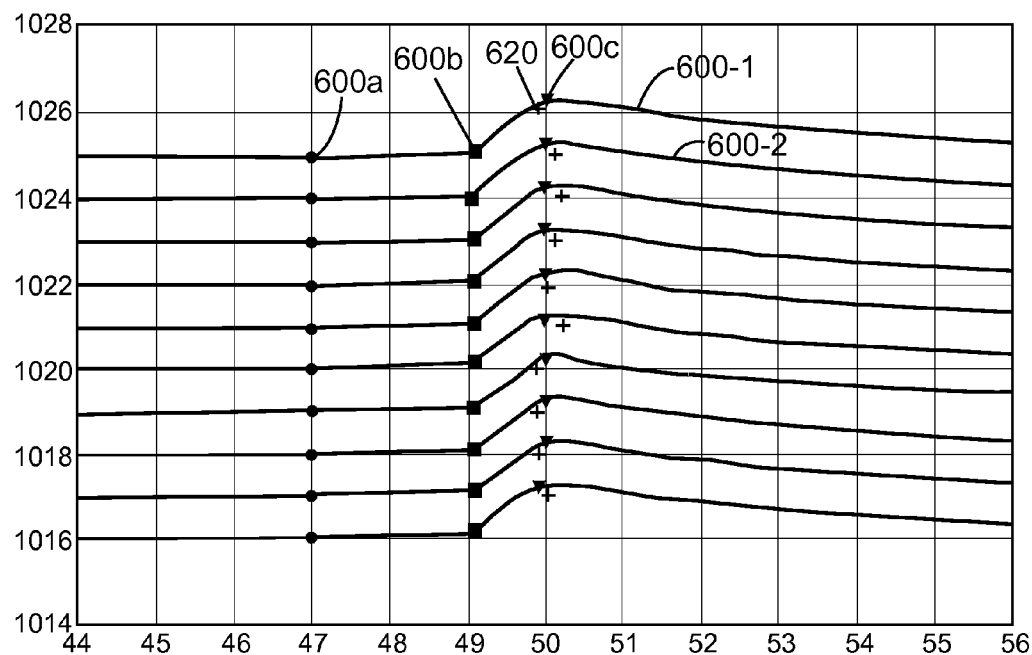
FIG. 7 illustrates the plural near-field signals corresponding to the single source aligned to each other according to an embodiment.

Thus, according to this embodiment, it is possible to use the start 600a of the near-field signal 600-1 and/or the start 600b of the slope 600d of the near-field signal 600-1 as indicators of the gun firing. In this case, the method aligns one or both of these indicators to synchronize the source array, resulting in an individual source having the near-field signals illustrated in FIG. 7.

Figure 8:
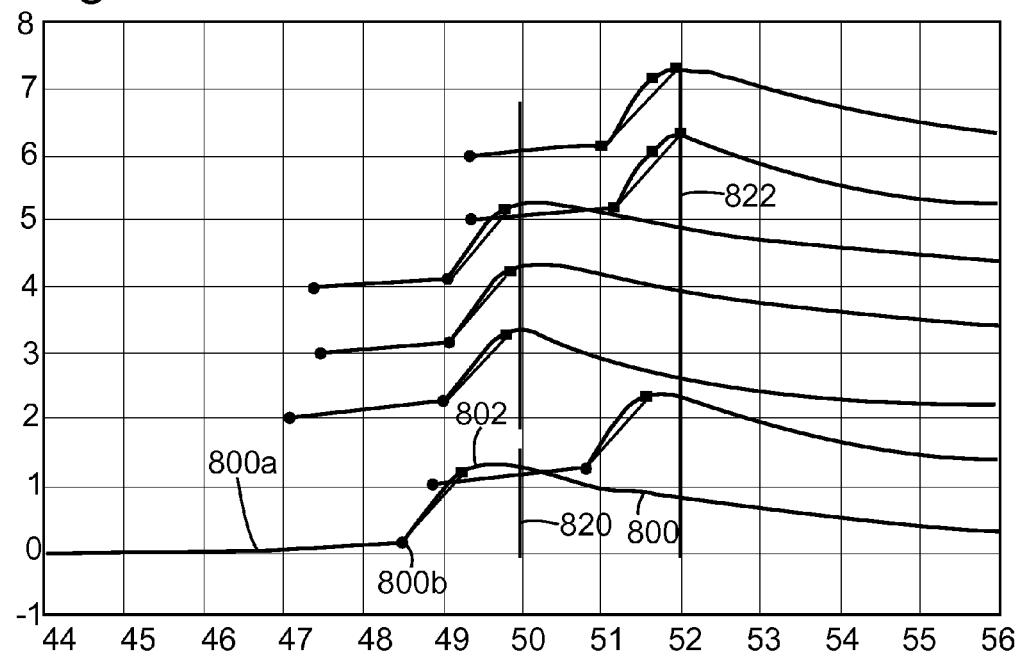
FIG. 8 illustrates mean near-field signals corresponding to various single sources that form a source array according to an embodiment.

According to another embodiment, the plural curves illustrated in FIGS. 6 and/or 7 may be used to determine a mean near-field signal. For example, with reference to FIG. 6, the near-field signals 600-1 to 600-10 corresponding to a given gun may be aligned using the start of the slope point, and then the aligned curves may be summed to obtain the mean near-field signal. In this regard, FIG. 8 shows a mean near-field signal 800 corresponding to a gun. Other mean near-field signals are shown in FIG. 8, and they correspond to other guns. The start point 800a of the mean near-field signal 800 may be calculated as the median of the start points 600a (see FIG. 6 or 7) of the individual near-field signals 600-1 to 600-10. The same calculation may be used for the start of the slope point 800b of the mean near-field signal 800. In one application, the mean near-field signal may be used for calibration or other purposes. In another application, a standard deviation of the start points or the start of the slope points relative to the mean start point or the mean start of the slope point, respectively, may be used to trigger gun maintenance. For example, if the calculated standard deviation is larger than a given value, then that gun is flagged for maintenance. Other parameters may be used to trigger gun maintenance, for example, the delay between the time-break signal and the near-field signal. Air gun maintenance may include, among others, a cleaning process, change of the O-ring, etc.

In another embodiment, there is a method for seismic surveying that includes a step of towing a source array in the water, the source array including at least a source element having a time-break sensor and a near-field sensor; a step of shooting selected source elements of the source array at a given time; a step of determining, for the at least a source element, an offset between a time-break signal recorded by the time-break sensor and a near-field signal recorded by the near-field sensor; and a step of determining that there is a malfunction in the at least a source element based on a variation in the offset between the time-break signal and the near-field signal. The method may also include a step in which the variation in the offset between the time-break signal and the near-field signal is used indicates a defect of the source array.

In still another embodiment, knowing the general characteristics of the individual sources, the method determines not only their mean near-field signals, but also an indicator 802 of the individual source firing time, e.g., the "best max" of the corresponding near-field signal, as if the individual source were shooting alone. This indicator 802 may be calculated as the best maximum of the mean near-field signal 800. In another application, the best maximum may be the sum of the start of slope of the near-field signal and an offset function. The offset function may depend on the gun volume and the gun type. Other parameters or functions may be used for defining the best maximum within the scope of the invention. Comparing this indicator to the aiming point 820, the method adjusts the offset in the gun controller for synchronizing the source array. This may be performed for each individual source in the source array. Also, note that FIG. 8 shows different aiming points 820 and 822. In other words, the method may use one or more aiming points, i.e., not all the individual sources need to have the same aiming point. The aiming points may be determined based on the desired far-field signature of the source array.

Next, a first method for synchronizing the source array is discussed with reference to FIG. 9. In step 900, a seismic survey is performed over a given subsurface. A system performing the survey is schematically illustrated in FIGS. 10A and 10B. System 1000 includes at least one vessel 1002 towing one or more streamers 1004 and one or more seismic source arrays 1006. FIG. 10A shows a sub-array 1006a having plural individual sources 1006b disposed at the same or different depths. Each individual source 1006b may have a corresponding local controller 1006c that may communicate with a global controller 1008 located on the vessel. Streamer 1004 may include plural receivers 1004a, e.g., hydrophone, geophone, 3-component receivers, accelerometers, combination of them, etc. Plural birds 1004b may be located along the streamer to control the shape and/or depth of the streamer. A seismic wave 1014 emitted by the individual source 1006b is shown reflecting from the ocean bottom 1016 and then being recorded by the receiver 1004a.

FIG. 10B shows the distribution of the source array 1006 and the various units located on the vessel, for example, the global controller 1008. A compressed air source 1010 (e.g., a compressor) provides compressed air through hoses 1012 to guns 1006b. A gun controller unit 1020 instructs each gun when to shoot. A data interface unit 1030 receives data from the guns, for example, the time-break signals, the near-field signals, etc. All these units may communicate with the global controller 1008. In one application, the global controller and the gun controller 1020 and/or the data interface 1030 form a single unit located on the vessel.

Figure 9:
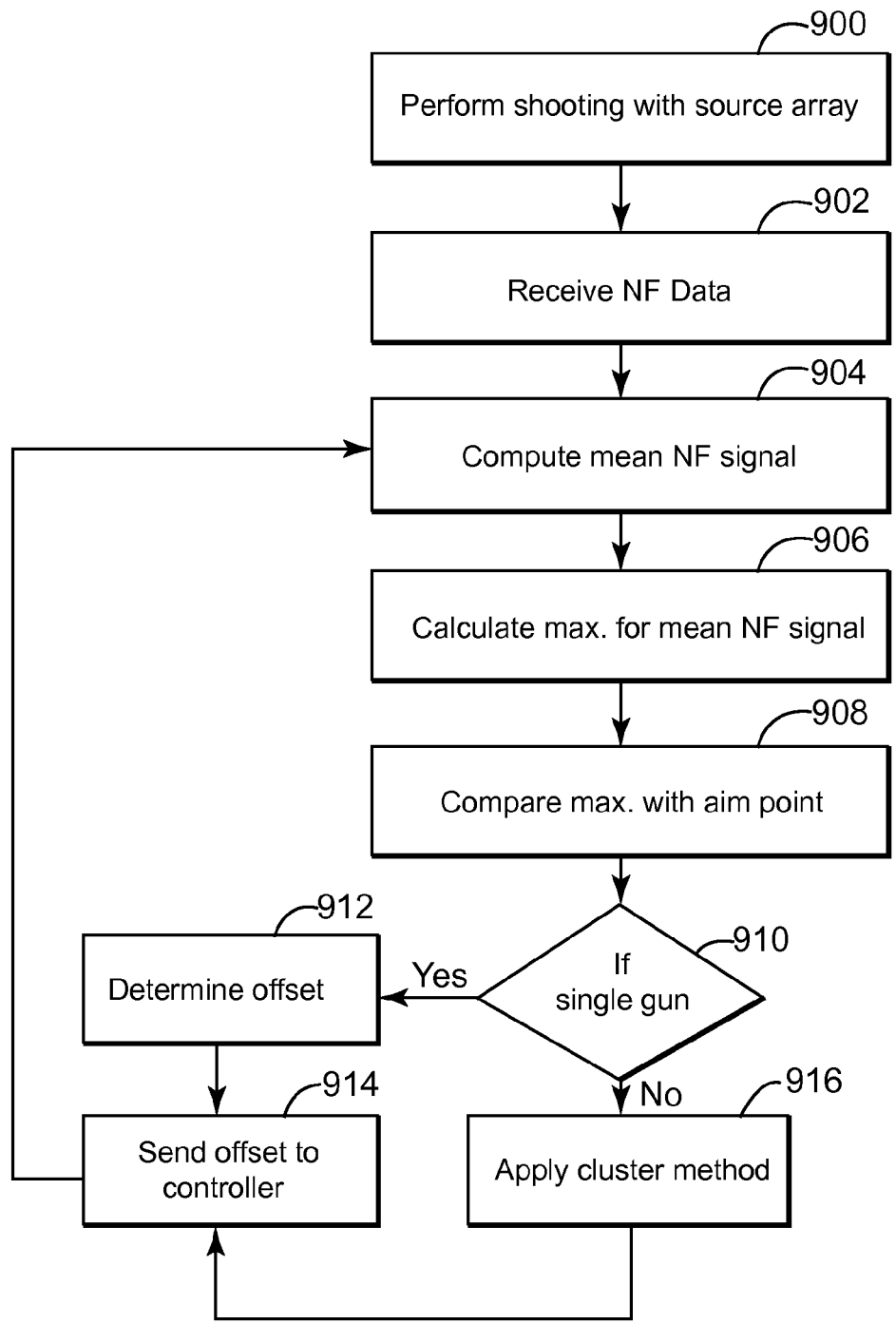
FIG. 9 is a flow-chart of a method for synchronizing a source array according to an embodiment.

Returning to step 900 of the method illustrated in FIG. 9, source 1006 is shot while vessel 1002 follows a shooting path. Near-field signals are recorded by a near-field sensor 1006d, which may be a hydrophone. The near-field sensor 1006d is located close to a corresponding individual source 1006a. The near-field signals may be recorded prior to starting the seismic survey, e.g., during a calibration phase in which each individual source of the source arrays is shot while the other individual sources are silent. Alternatively or in addition, the near-field signals may be recorded during the seismic survey, for example, during a phase in which the vessel changes lines and the individual sources are shot sequentially, one by one. Further, the near-field signals may be recorded during the seismic survey, for example, while following a given path, by muting the other individual sources.

Thus, in step 902, near-field signals for the individual sources are received by a controller (e.g., global controller 1008, local controller 1006c, or both). Based on this data, in step 904, the mean near-field signals for the individual sources are computed (see, for example, FIG. 8 and associated description). In step 906, the best maxima for the mean near-field signals are calculated and in step 908, for a given individual source, its best maximum is compared to its corresponding aim point. If in step 910 it is determined that the individual source includes only a single gun, in step 912 it is determined the offset between the best maximum of the mean near-field signal and the aim point, and this offset is sent in step 914 to the gun controller to synchronize the individual source. Then, the algorithm returns to step 904 to synchronize another individual source. However, if it is determined in step 910 that the individual source includes two or more guns (i.e., a cluster), a cluster method is applied in step 916 to determine the offset for each gun of the cluster, and this information is then sent to the controller in step 914. The cluster method is discussed later.

An alternative to this method is now discussed with reference to FIG. 11A. When an individual source includes more than one gun, i.e., a cluster, each gun in the cluster is shot individually (during the bubble test), prior to or during the seismic survey, and the near-field signal for each gun in the cluster is recorded in step 1100. Then, the seismic survey is started and the source array is shot in step 1102. In step 1104, near-field signals for the individual sources are received by a controller (e.g., global controller 1008, local controller 1006c, or both). Based on this data, optionally, the mean near-field signals for the individual sources are computed (see, for example, FIG. 8 and associated description).

In step 1108, the best maxima for the near-field signals are calculated (or the mean near-field signals if step the optional step noted above is implemented), and in step 1110, for a given individual source, the best maximum is compared to its corresponding aim point. When comparing the two, it is possible to correct the best maximum based on a time-break deviation and a distance between the source element and the position of the near-field sensor. If in step 1112 it is determined that the individual source includes only a single gun, in step 1114 it is determined the offset between the best maximum of the near-field signal and the aim point, and this offset is sent in step 1116 to the gun controller to synchronize the individual source. Then, the algorithm returns to step 1102 to synchronize another individual source element. However, if it is determined in step 1112 that the individual source includes two or more guns (i.e., a cluster), then the algorithm removes in step 1118, after a proper offset of the cluster is computed, the reference signal (i.e., the near-field signal calculated during the bubble test) of the first gun in the cluster. There are various ways to calculate the proper offset, one of which is now discussed.

According to this case, it is assumed that the first gun of the cluster is shooting first and the second one is delayed. Assume that d1 is the offset between TB and NF for the first gun and d2 is the offset between TB and NF for the second gun, dt1i is the noise for the first gun firing and dt2i is the noise for the second gun firing, i.e., dt1i is the difference between the aim point and the TB of the first gun for SPi (shot point i) and dt2i is the same difference for the second gun in the cluster. Thus, for each of N SPi, there are the signals just discussed. What is known are dt1i, dt2i, NFi (near-field for cluster "i") and the NF function for one gun from the bubble test. What is left is to calculate d1 and d2, which are assumed to be constant.

Thus, using the following equation:

$$NFi(\text{cluster})=NF(\text{gun1}(t+dt1i+d1))+NF(\text{gun2}(t+d2+dt2i))+\text{other guns,}$$

it is possible to calculate d1 and d2. For example, considering only the first millisecond of data after the aim point, the near-field signals from other guns is 0. If the NFi(cluster) before the guns are shoot is considered, this value is zero. Thus, it is possible to determine either d1 or d2 and then the other one.

In step 1120, the residual signal is computed and the best maximum for the residual signal is determined as discussed above. The residual signal may be computed as follows. Assume that it was determined that the first gun in the cluster is shooting first. Determine d1 as discussed previously so that the start of signal of NF(gun1(t+dti+d1)=start of signal NFi(cluster). Then, remove the first 10 ms of the signal after the start of signal NF(gun1(t+dti+d1) from the NFi(cluster) signal to obtain the residual signal. For the residual signal, determine the start of signal and best maximum as discussed above. The best maximum is used in step 1122 to determine the offset of the second gun in the cluster. This information is then passed to the gun controller in step 1116.

Note that if both guns in the cluster are firing at the same time and there is an offset to the firing aiming point, the offset calculated in steps 1118 to 1122 is sent to the gun controller in step 1116. If the guns are not firing at the same time, the cluster method (to be discussed next) is used to determine the offset.

Figure 11A:
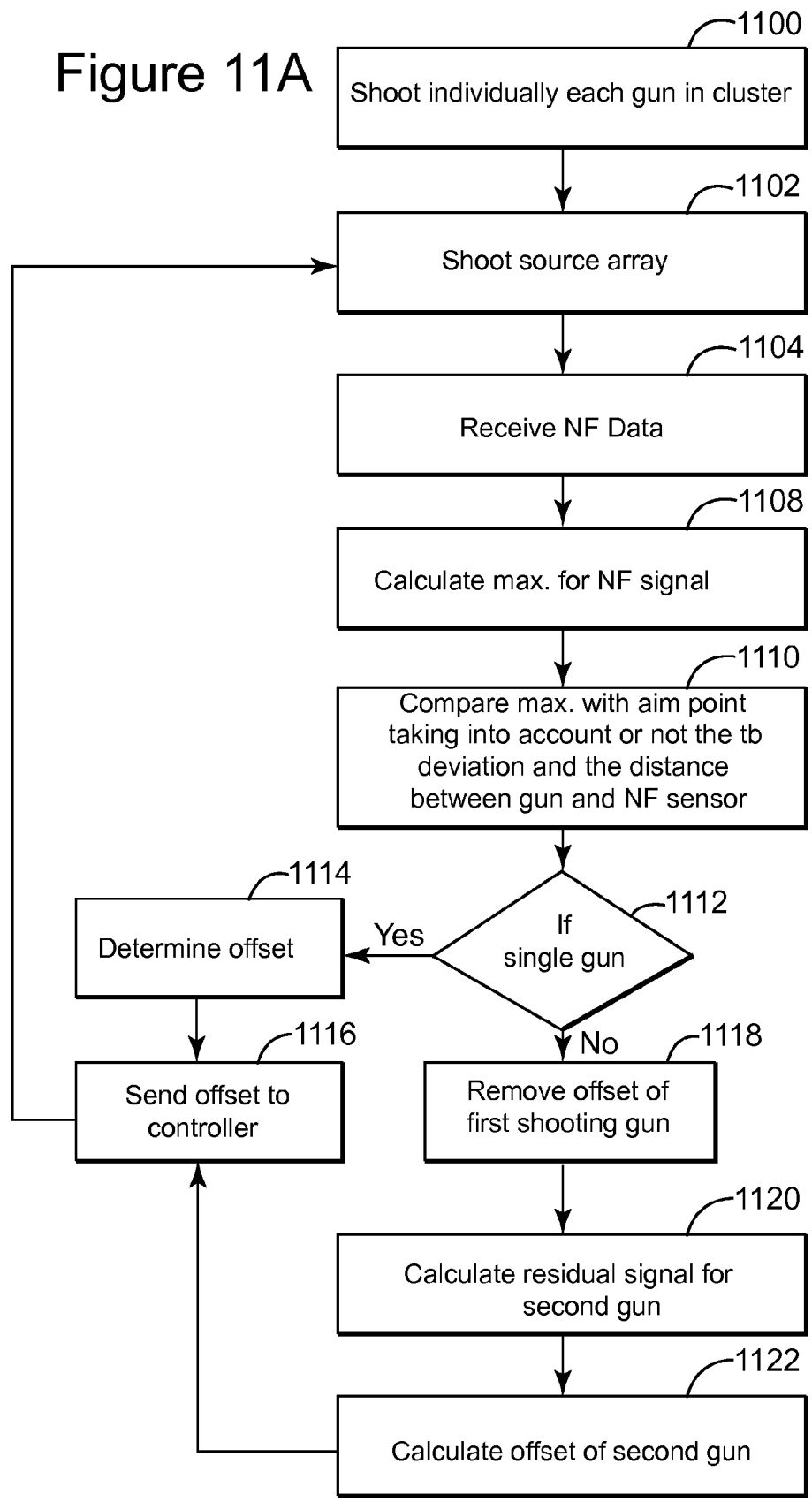
FIG. 11A is a flow-chart of another method for synchronizing a source array according to an embodiment.
Figure 11B:
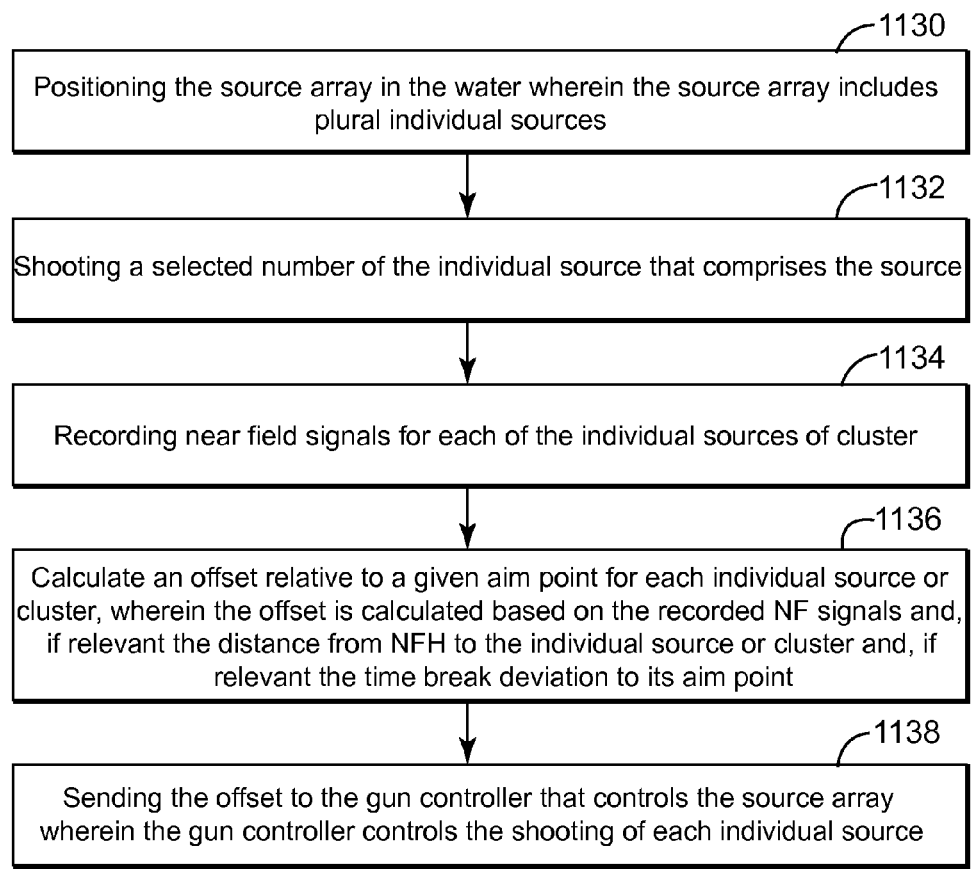
FIG. 11B is a flow-chart of a method for determining an offset for a source array according to an embodiment.

In an alternative embodiment, as illustrated in FIG. 11B, it is possible to position in step 1130 the source array in water, wherein the source array includes plural individual sources, in step 1132 to shot a selected number of the individual sources, in step 1134 to record near-field signals for each of the individual source elements or clusters, in step 1136 to calculate an offset relative to a given aim point for each source element or cluster, wherein the offset is calculated based on the recorded near-field signals and, if relevant, the distance from the near-field sensor to the corresponding source element or cluster, and, if relevant, also the time-break deviation to its aim point, and in step 1138 sending the offset to the gun controller that controls the source array wherein the gun controller controls the shooting of each individual source element.

Figure 12:
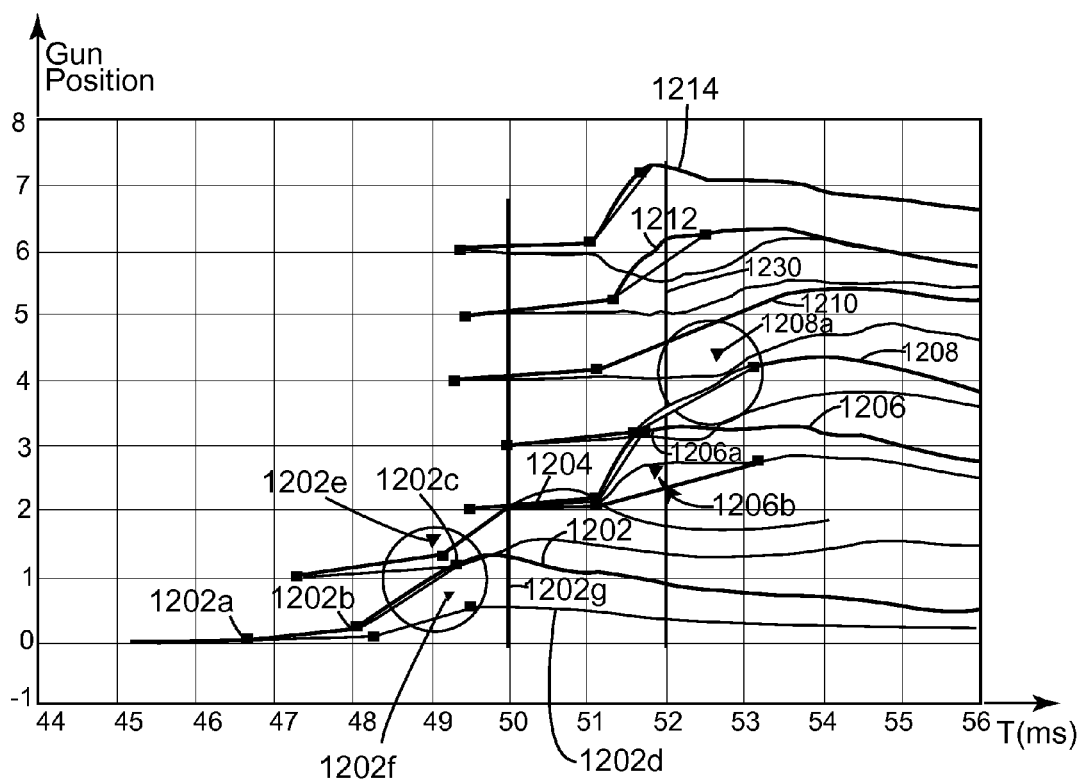
FIG. 12 illustrates mean near-field signals for individual sources that make up a source array according to an embodiment.

FIG. 12 illustrates mean near-field signals for seven different gun positions, the first and third positions being occupied by clusters. FIG. 12 shows the cluster mean near-field signal 1202 having a start of signal point 1202*a*, a start of slope signal point 1202*b* and a best maximum 1202*e* for the first shooting gun. After the contribution of the first shooting gun is removed, the mean residual signal 1202*d* is left, having a best maximum 1202*f*. Note that both guns of the cluster shoot early relative to their aim point 1202*g*. The guns in the second, third, fifth, sixth and seventh positions are well-synchronized. The cluster in the third position has the best maximum 1206*a* for the first gun and the best maximum 1206*b* for the second gun well-synchronized to their aim point 1230. The fourth-position gun has its best maximum 1208*a* late relative to the aim point 1230, indicating a late shooting.

The cluster method is now discussed, and it may be applied to any of the methods illustrated in FIGS. 9 and 11. One variant of the cluster method uses the time-break information traditionally found in the gun controller for each gun in the cluster and correlates this information with the start of slopes of the mean near-field signals previously calculated. This correlation is thus used to determine which gun is shooting first (the method works if the guns are desynchronized). Then, the cluster method performs steps 1118 to 1122 illustrated in FIG. 11A, but instead of removing the signal of the first gun as noted in step 1118, the cluster method removes the signal of the first gun synchronized with the start of the slope of the mean near-field signal. Then, the cluster method determines the offset of the other gun from the mean residual.

In a second alternative, the cluster method uses a bubble test at the first opportunity during the seismic survey. In a third alternative, it is possible to stop the gun expected to shoot later in time in the cluster, for some shots, and then process those shots considering there is no cluster but a single gun.

In a fourth alternative, the cluster method applies in the gun controller new offsets (e.g., random offsets) for the guns of the cluster and processes the data to evaluate whether both guns in the cluster are synchronized. If the results are worse than using the old offsets, new values are computed as it is now known which gun is first because the guns are now desynchronized.

In a fifth alternative, the cluster method applies a new offset in the gun controller to make the first gun shoot even earlier than before for a couple of shots, to confirm that this gun is shooting earlier than the other, and then reapply the old offset. If the application of the new offset confirms the gun shoots earlier, then one of the above cluster methods is applied.

Figure 13:
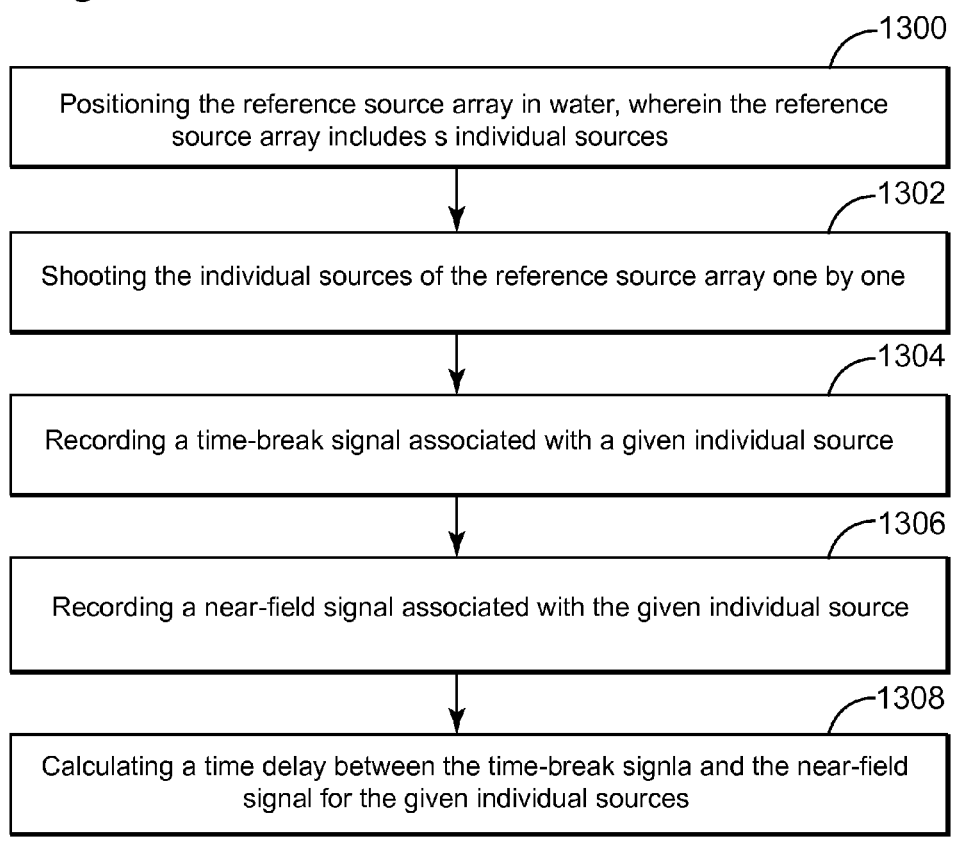
FIG. 13 is a flow-chart of a method for synchronizing a source array according to another embodiment.

To summarize, according to an embodiment illustrated in FIG. 13, there is a method for synchronizing a reference source array for a seismic survey. The method includes a step 1300 of positioning the reference source array in water, wherein the reference source array includes plural individual sources, a step 1302 of shooting the individual sources of the reference source array one by one, a step 1304 of recording a time-break signal associated with a given individual source, a step 1306 of recording a near-field signal associated with the given individual source, and a step 1308 of calculating a time delay between the time-break signal and the near-field signal for the given individual source.

Figure 14:
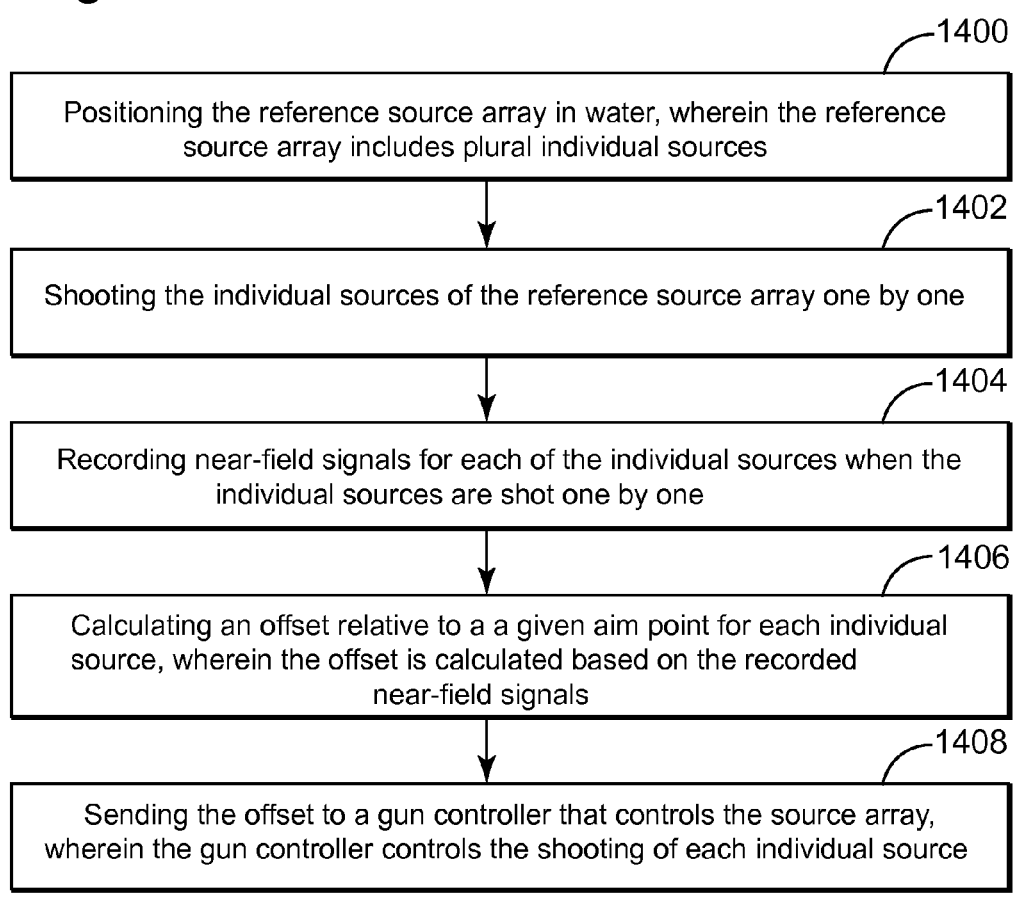
FIG. 14 is a flow-chart of a method for synchronizing a source array according to still another embodiment.

According to another embodiment illustrated in FIG. 14, there is a method for optimizing a reference source array's synchronization for a seismic survey. The method includes a step 1400 of positioning the reference source array in water, wherein the reference source array includes plural individual sources, a step 1402 of shooting the individual sources of the reference source array one by one, a step 1404 of recording near-field signals for each of the individual sources when the individual sources are shot one by one, a step 1406 of calculating an offset relative to a given aim point for each individual source, wherein the offset is calculated based on the recorded near-field signals, and a step 1408 of sending the offset to a gun controller that controls the source array, wherein the gun controller controls the shooting of each individual source.

The above discussed method may be modified so that the offset is corrected to align the near-field signals with the aim point instead of aligning the time-break signal with the aim point. In other words, it is possible to align the time-break signal with an offset from the aim point so that the near-field signals are aligned with the aim point. Alternatively, it is possible that the offset is corrected based on a time break deviation from the near-field signals.

Figure 15A:
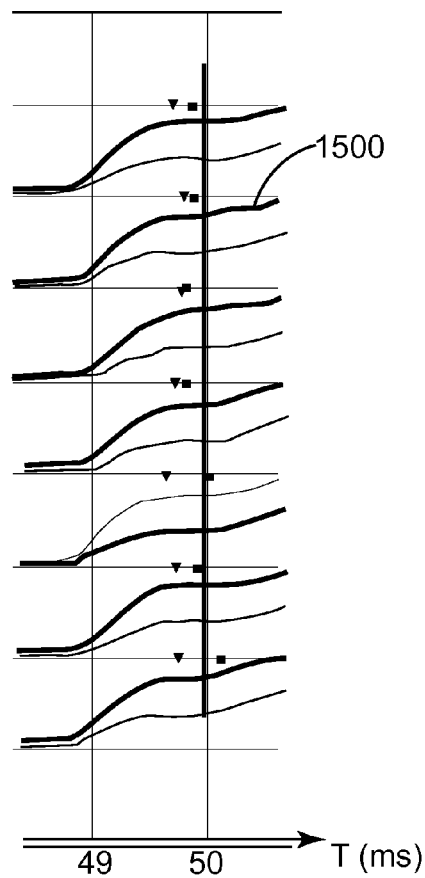
FIGS. 15A-B are schematic diagrams of near-field signatures associated with a source array.
Figure 15B:
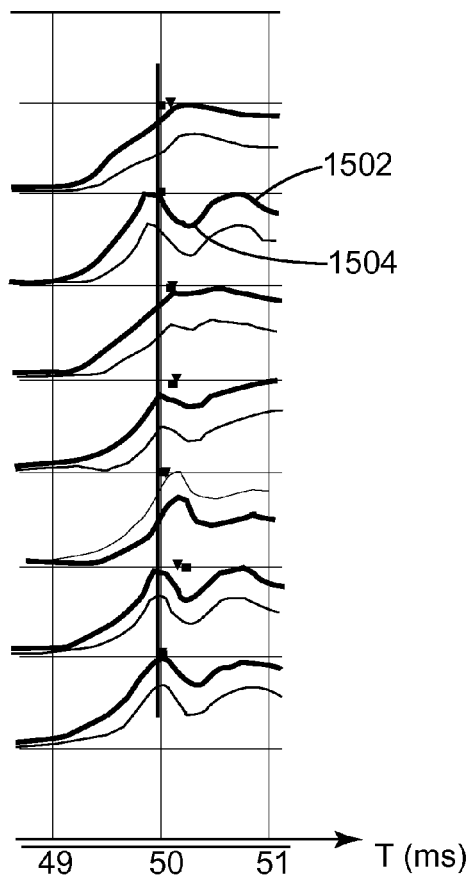

According to another embodiment, there is method of seismic surveying that uses a dip in a near-field signature for determining when a fault is present in a seismic source. The method includes a step of towing a source array in water, wherein the source array includes at least one source element having a near-field sensor; a step of shooting selected source elements of the source array at a given time; a step of recording a near-field signal recorded with the near-field sensor; a step of identifying whether there is a significant dip in the near-field signal, after a start of a slope of the near-field signal; and a step of determining a fault in the source array if the dip exceeds a given threshold within a given offset from the start of the slope of the near-field signal. In this regard, FIG. 15A shows near-field signals 1500 with no dip, i.e., no faults in the source array, and FIG. 15B shows near-field signals 1502 having a pronounced dip 1504 that is indicative of a fault in the source array. This fault can be seen anytime, i.e., during a bubble test or while shooting the source array. Note that for this embodiment, a near-field signature is not necessary to be calculated.

The above disclosed methods may be implemented in a device different than the gun controller, e.g., a computing device, and the results generated by the computing device are then manually or automatically input into the gun controller. This is specifically appropriate when the operator of the gun controller does not have access to the logic of the gun controller, which is the case when the gun controllers are provided by a third party. However, if access to the logic of the gun controllers is available, one or more of the above-discussed methods may be implemented directly into the gun controller.

Figure 16:
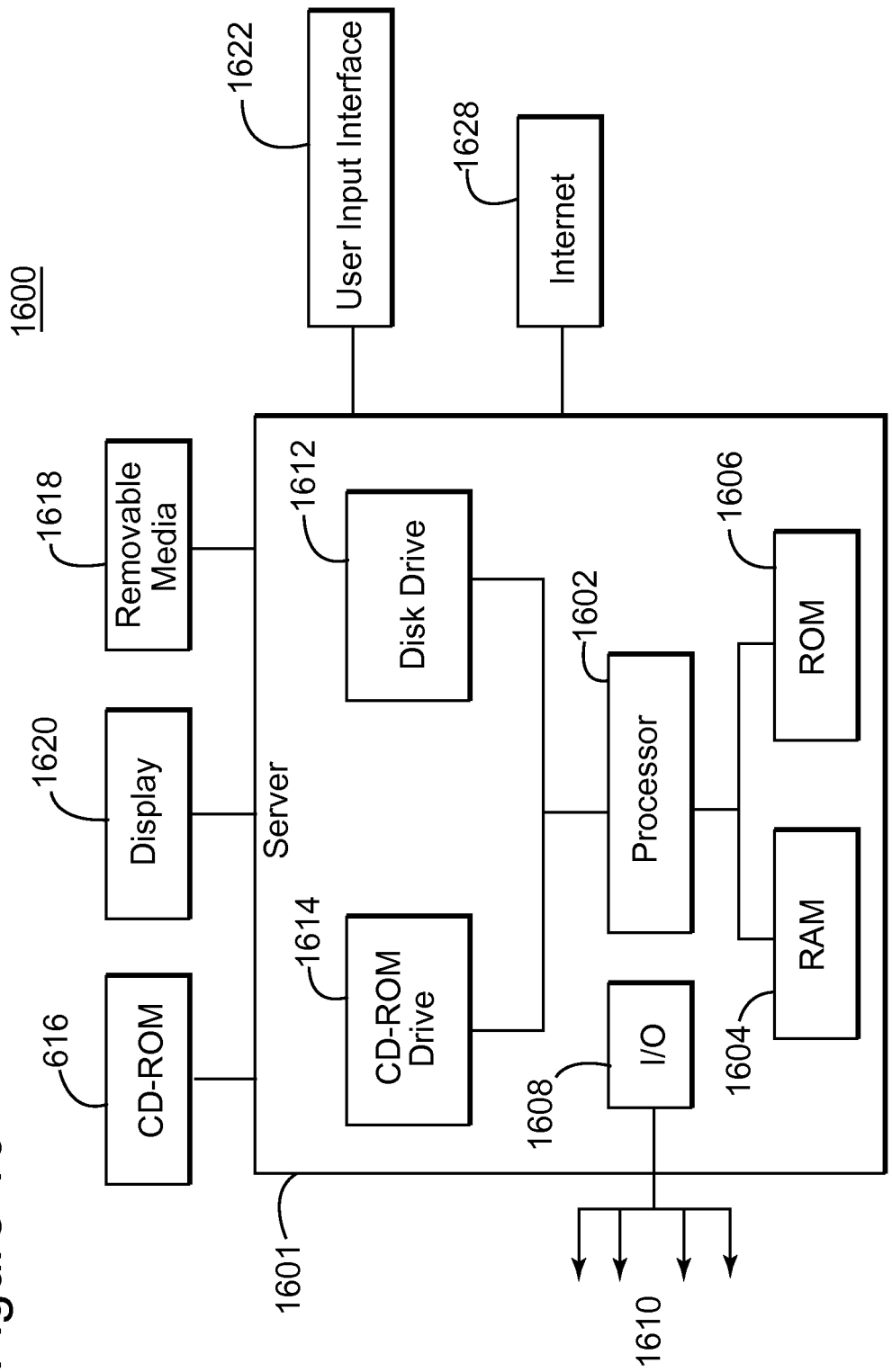
FIG. 16 is a schematic diagram of a computing device configured to partially or wholly implement the methods depicted herein.

A possible configuration of the computing device or gun controller noted above is illustrated in FIG. 16. The exemplary computing device 1600 suitable for performing the activities described in the above embodiments may include a server 1601. Such a server 1601 may include a central processor (CPU) 1602 coupled to a random access memory (RAM) 1604 and to a read only memory (ROM) 1606. The ROM 1606 may also be other types of storage media to store programs, such as programmable ROM (PROM), erasable PROM (EPROM), etc. The processor 1602 may communicate with other internal and external components through input/output (I/O) circuitry 1608 and bussing 1610, to provide control signals and the like. The processor 1602 carries out a variety of functions as are known in the art, as dictated by software and/or firmware instructions.

The server 1601 may also include one or more data storage devices, including hard drives 1612, CDROM drives 1614, and other hardware capable of reading and/or storing information such as DVD, etc. In one embodiment, software for carrying out the above-discussed steps may be stored and distributed on a CDROM or DVD 1616, a USB storage device 1618 or other form of media capable of portably storing information. These storage media may be inserted into, and read by, devices such as the CDROM drive 1614, the disk drive 1612, etc. The server 1601 may be coupled to a display 1620, which may be any type of known display or presentation screen, such as LCD displays, plasma display, cathode ray tubes (CRT), etc. A user input interface 1622 is provided, including one or more user interface mechanisms such as a mouse, keyboard, microphone, touchpad, touch screen, voice-recognition system, etc.

The server 1601 may be coupled to other devices, such as sources, detectors, etc. The server may be part of a larger network configuration as in a global area network (GAN) such as the Internet 1628, which allows ultimate connection to the various landline and/or mobile computing devices.

The above embodiments were discussed without specifying what types of streamers are used to record the seismic data. The streamers may be horizontal or slanted or having a curved profile as illustrated in FIG. 17.

Figure 17:
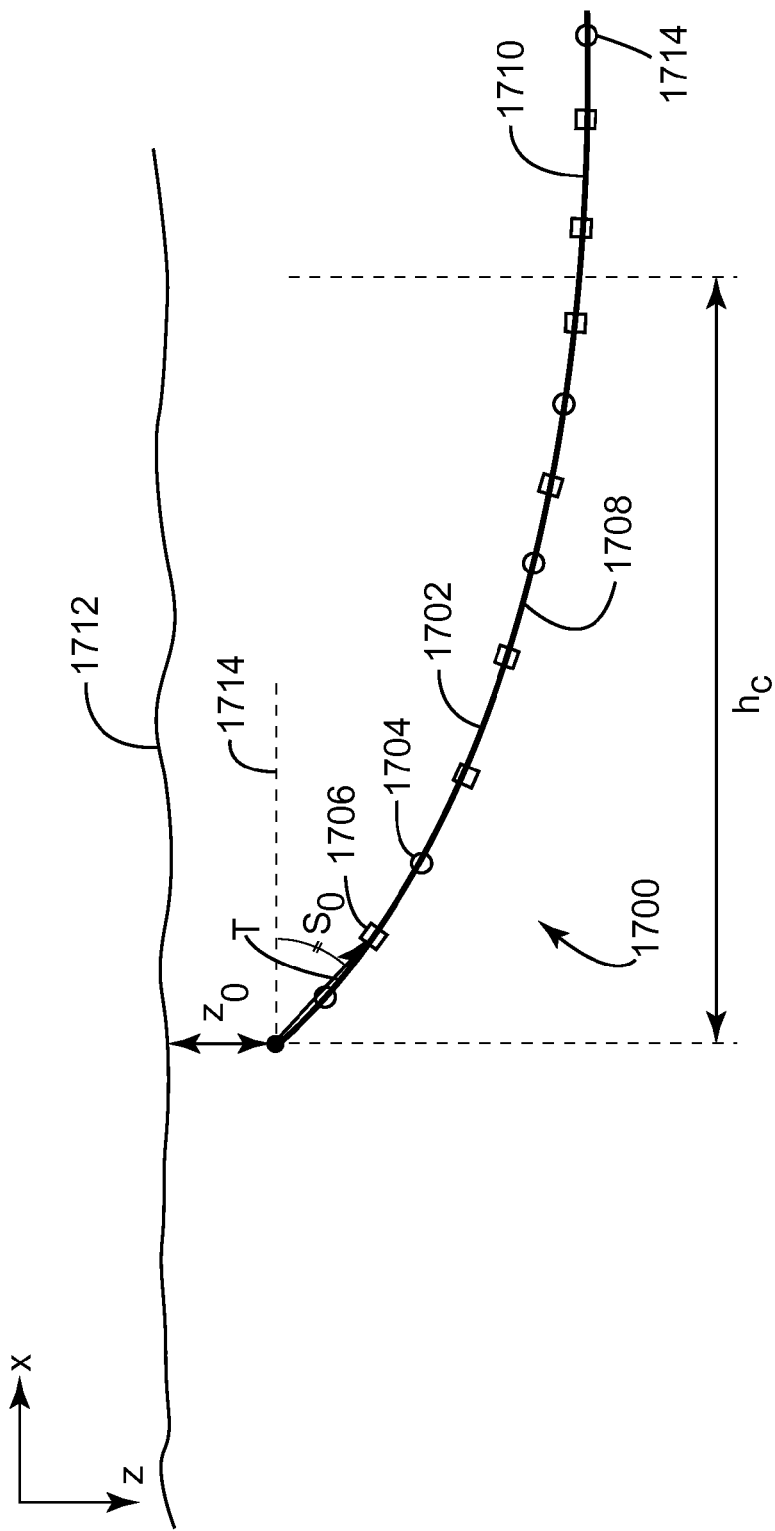
FIG. 17 illustrates a curved streamer.

The curved streamer 1700 of FIG. 17 includes a body 1702 having a predetermined length; plural detectors 1704 provided along the body; and plural birds 1706 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 1712), (ii) a slope $s_0$ of a first portion T of the body with an axis 1714 parallel with the water surface 1712, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 1708 of the streamer. In other words, the streamer may have (i) only a portion 1708 having the curved profile or (ii) a portion 1708 having the curved profile and a portion 1710 having a flat profile, the two portions being attached to each other.

Figure 18:
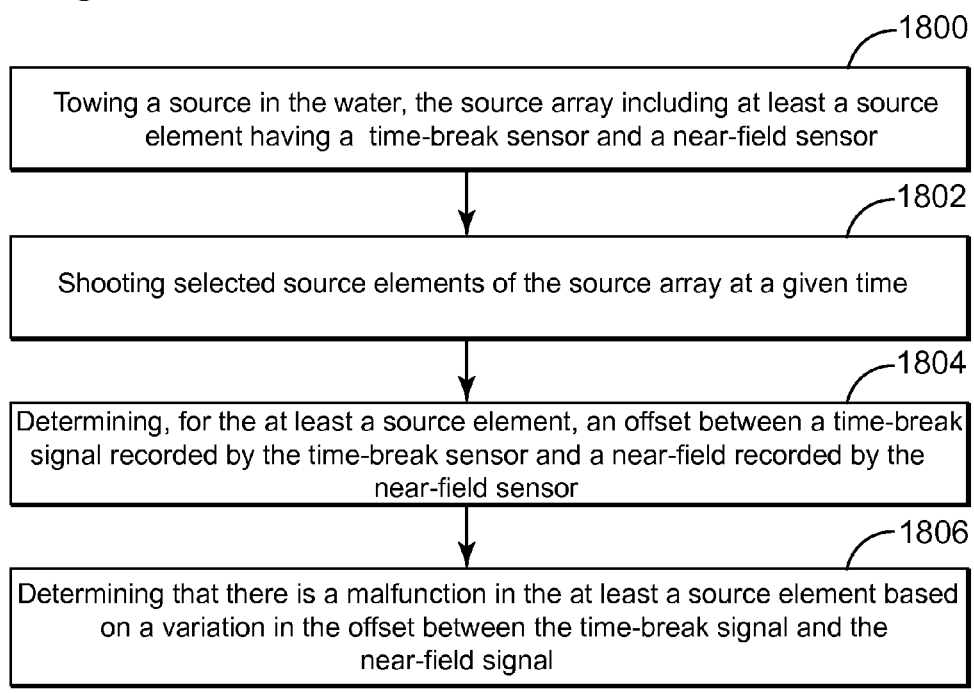
FIG. 18 is a flow-chart of a method for determining a malfunctioning source array according to an embodiment.

The above discussed embodiments have exemplified some situations for which the near-field signals may be used to improve source shooting. However, these embodiments may be applied for other purposes, for example, a method for determining a malfunction of a source element. Such a method is illustrated in FIG. 18 and includes a step 1800 of towing a source array in the water, the source array including at least a source element having a time-break sensor and a near-field sensor, a step 1802 of shooting selected source elements of the source array at a given time, a step 1804 of determining, for the at least a source element, an offset between a time-break signal recorded by the time-break sensor and a near-field signal recorded by the near-field sensor, and a step 1806 of determining that there is a malfunction in the at least a source element based on a variation in the offset between the time-break signal and the near-field signal. In one application, a variation in the offset between the time-break signal and the near-field signal indicates a defect of the source array.

Figure 19:
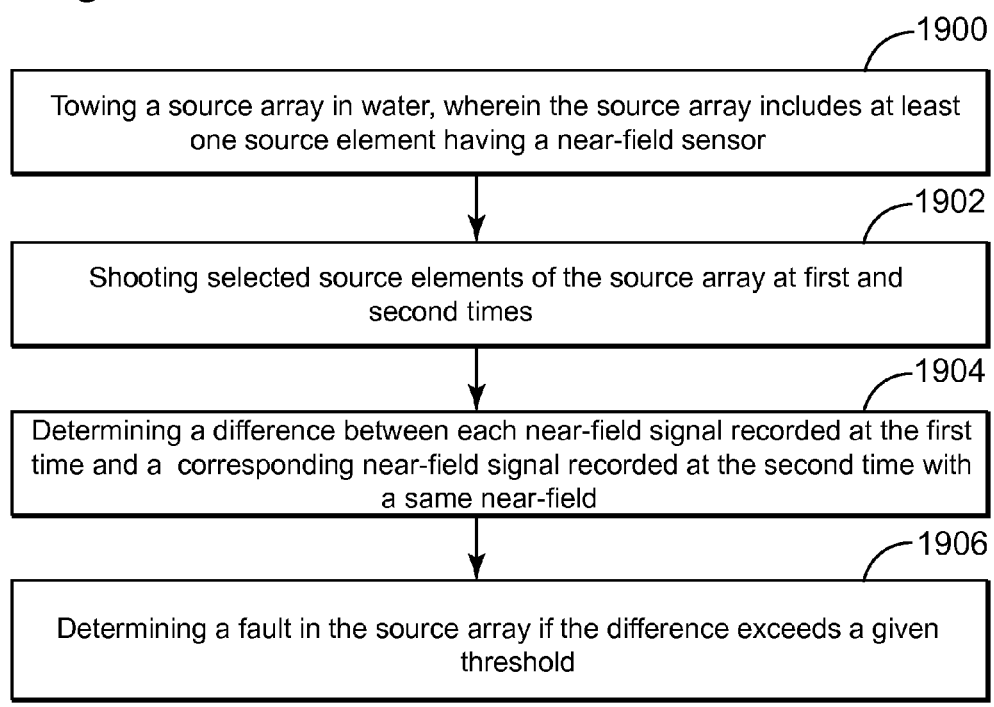
FIG. 19 is a flow-chart of a method for determining a fault in a source array according to an embodiment.

In another embodiment illustrated in FIG. 19, there is a method for determining a fault in a source array. The method includes a step 1900 of towing a source array in water, wherein the source array includes at least one source element having a near-field sensor, a step 1902 of shooting selected source elements of the source array at first and second times; a step 1904 of determining a difference between each near-field signal recorded at the first time and a corresponding near-field signal recorded at the second time with a same near-field sensor, wherein the difference is calculated after aligning the near-field signals, recorded at the first and second times, at their start of slope point, before adjacent source elements signals reach the near-field sensor, and a step 1906 of determining a fault in the source array if the difference exceeds a given threshold.

Figure 20:
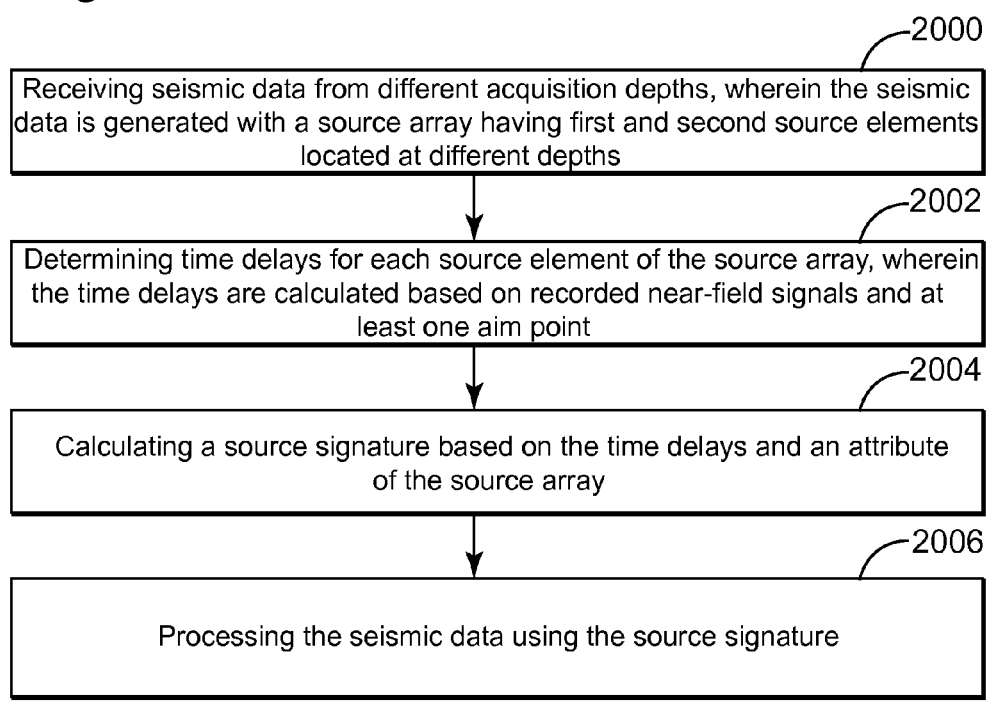
FIG. 20 is a flow-chart of another method for determining a fault in a source array according to an embodiment.

Another application of the embodiments discussed above is for a processing broadband data. Broadband data is acquired when the receivers are capable to record such data (see, for example, streamer illustrated in FIG. 17) and/or when the source array has the capability to emit broadband data (see, for example, source array illustrated in FIG. 4A). A method for acquiring and processing broadband data, as illustrate in FIG. 20, includes a step 2000 of receiving seismic data from different acquisition depths, wherein the seismic data is generated with a source array having first and second source elements located at different depths, a step 2002 of determining time delays for each source element of the source array, wherein the time delays are calculated based on recorded near-field signals and at least one aim point, a step 2004 of calculating a source signature based on the time delays and an attribute of the source array, and a step 2006 of processing the seismic data using the source signature.

The seismic data includes data from at least one of a hydrophone, multi-component sensor, geophone or a combination thereof and the attribute is related to a geometry of the source array, or a type of the source elements or a volume of each source element.

Figure 21:
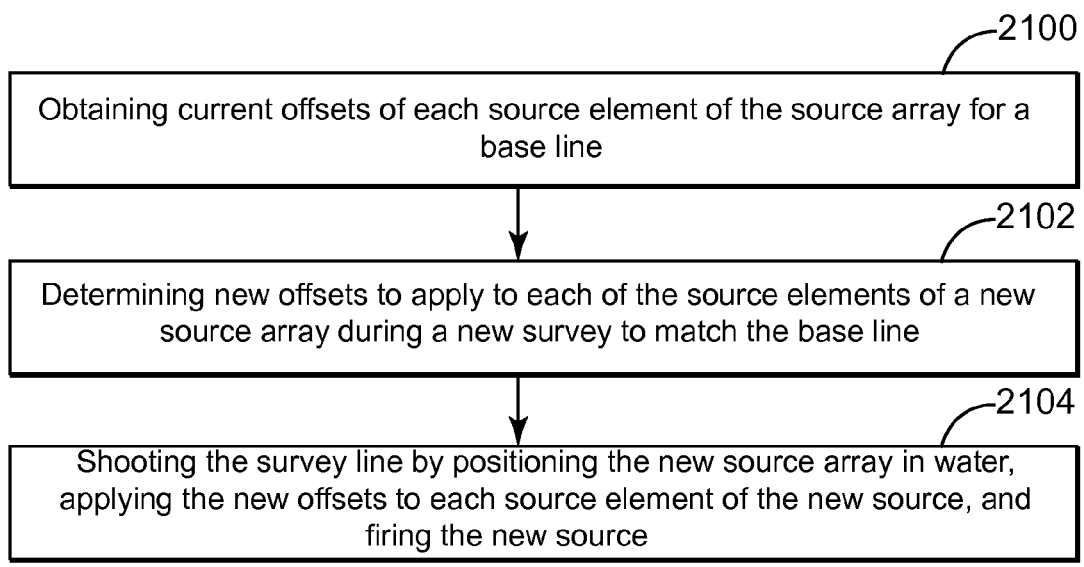
FIG. 21 is a flow-chart of a method for matching a source in later survey to a source in a base survey according to an embodiment.

According to another embodiment, there is a method, as illustrated in FIG. 21, for performing a repeated marine seismic survey line. This method may be advantageous during a 4D seismic survey. The method includes a step 2100 of obtaining current offsets of each source element of the source array for a base line, a step 2102 of determining new offsets to apply to each of the source elements of a new source array during a new survey to match the base line, and a step 2104 of shooting the survey line by positioning the new source array in the water, applying the new offsets to each source element of the new source, and firing the new source. The new offsets may be determined for the entire survey line or for parts of the survey line or for each shot point.

According to still another embodiment, there is a method for optimizing a first source array's synchronization for a seismic survey. The method includes a step 2200 of positioning the first source array in water, wherein the first source array includes plural individual sources, a step 2202 of shooting a selected subset of the individual sources of the first source array, a step 2204 of recording near-field signals for each of the individual sources or clusters, a step 2206 of calculating an offset relative to a given aim point for each individual source or cluster, wherein the offset is calculated based on the recorded near-field signals, and a step 2208 of using the offset to change a firing time of each individual source.

According to yet another embodiment, there is a seismic surveying system 1000 for acquiring broad band data. The system includes a vessel 1002 that tows a multi-level source array 1006, wherein each individual source element 1006*b* or cluster has a determined shooting aim point relative to others. The system also includes a gun controller 1008 for controlling the multi-level source array 1006, near-field sensors 1006*d* associated with the individual source elements or clusters of the source array 1006 and plural hydrophones and multi-component sensors 1004*a* towed at different depths. The near-field signals recorded by the near-field sensors are processed to determine offsets between the individual sources or clusters and their aim points, and the offsets are used by the gun controller to ensure that when a time-break deviation is null, the individual sources or clusters are shooting at their given determined aim point. The gun controller may be programmed to execute any of the methods discussed in this application.

The disclosed exemplary embodiments provide methods for synchronizing individual sources in a source array, for detecting a fault in a source array and for acquiring broadband data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for quality control of a first source array for a seismic survey, the method comprising:
    towing the first source array in water, wherein the first source array includes plural individual sources;
    shooting at least one of the individual sources of the first source array;
    receiving a time-break signal associated with a given individual source;
    recording a near-field signal associated with the given individual source; and
    calculating a time delay between (1) a time-break point of the time-break signal and (2) a point of the near-field signal for the given individual source,
    wherein the point on the near-field signal is a start of slope or a best maximum point.

2. The method of claim 1, wherein the time delay for the given individual source is calculated as a difference in time between the time-break point and the start of slope of the near-field signal recorded with a hydrophone located next to the given individual source.

3. The method of claim 1, wherein the step of calculating the time delay further comprises:
    computing the best maximum point from the near-field signal recorded with a hydrophone located next to the given individual source,
    wherein the time delay of the given individual source is a difference in time between the time-break point and the best maximum point of the near-field signal.

4. The method of claim 3, wherein the best maximum is a sum of a start of slope of the near-field signal and an offset function that depends on a gun volume and a gun type for the given individual source.

5. The method of claim 3, wherein the best maximum is a sum of a start of slope of the near-field signal and an offset function determined during a bubble test during which the given individual source has been shooting alone.

6. The method of claim 1, wherein a first time delay of a first source element in a cluster belonging to the first source array is calculated as a difference in time between the time break point of the first source element in the cluster and a start of slope of a near-field signal recorded with a hydrophone located next to the first source element.

7. The method of claim 6, wherein a second time delay of a second source element in the cluster is calculated as a difference in time between the time break point of the second source element and a start of slope of a residual near-field signal recorded with a hydrophone located next to the second source element, wherein the residual near-field signal is computed by removing a reference signal from a mean near-field signal of the cluster.

8. The method of claim 7, further comprising:
    firing the cluster for a number of times;
    correlating first and second time delays variations with a time-break variation to determine which source element of the cluster has fired first; and
    determining a delay of each source element in the cluster.

9. The method of claim 1, wherein the time delay is corrected with a travel time of an acoustic wave that propagates from (i) the given individual source to (ii) a corresponding near-field sensor.

10. A method for quality control of a first source array for a seismic survey, the method comprising:
    towing the first source array in water, wherein the first source array includes plural individual sources;
    shooting at least one of the individual sources of the first source array;
    receiving a time-break signal associated with a given individual source;
    recording a near-field signal associated with the given individual source; and
    calculating a time delay between the time-break signal and the near-field signal for the given individual source,
    wherein the step of calculating the time delay further comprises:
    computing a best maximum point of the near-field signal recorded with a hydrophone located next to the given individual source,
    wherein the time delay of the given individual source is a difference in time between the time-break signal and the best maximum point of the near-field signal, and
    wherein the best maximum is a sum of a start of slope of the near-field signal and an offset function that depends on a gun volume and a gun type for the given individual source.

11. The method of claim 10, wherein a first time delay of a first source element in a cluster belonging to the first source array is calculated as a difference in time between the time break signal of the first source element in the cluster and a start of slope of a near-field signal recorded with a hydrophone located next to the first source element.

12. The method of claim 11, wherein a second time delay of a second source element in the cluster is calculated as a difference in time between the time break signal of the second source element and a start of slope of a residual near-field signal recorded with a hydrophone located next to the second source element, wherein the residual near-field signal is computed by removing a reference signal from a mean near-field signal of the cluster.

13. The method of claim 12, further comprising:
firing the cluster for a number of times;
correlating first and second time delays variations with a time-break variation to determine which source element of the cluster has fired first; and
determining a delay of each source element in the cluster.

14. The method of claim 10, wherein the time delay is corrected with a travel time of an acoustic wave that propagates from (i) the given individual source to (ii) a corresponding near-field sensor.

15. A method for quality control of a first source array for a seismic survey, the method comprising:
towing the first source array in water, wherein the first source array includes plural individual sources;
shooting at least one of the individual sources of the first source array;
receiving a time-break signal associated with a given individual source;
recording a near-field signal associated with the given individual source; and
calculating a time delay between the time-break signal and the near-field signal for the given individual source,
wherein the step of calculating the time delay further comprises:
computing a best maximum point of the near-field signal recorded with a hydrophone located next to the given individual source,
wherein the time delay of the given individual source is a difference in time between the time-break signal and the best maximum point of the near-field signal, and
wherein the best maximum is a sum of a start of slope of the near-field signal and an offset function determined during a bubble test during which the given individual source has been shooting alone.

16. The method of claim 15, wherein a first time delay of a first source element in a cluster belonging to the first source array is calculated as a difference in time between the time break signal of the first source element in the cluster and a start of slope of a near-field signal recorded with a hydrophone located next to the first source element.

17. The method of claim 16, wherein a second time delay of a second source element in the cluster is calculated as a difference in time between the time break signal of the second source element and a start of slope of a residual near-field signal recorded with a hydrophone located next to the second source element, wherein the residual near-field signal is computed by removing a reference signal from a mean near-field signal of the cluster.

18. The method of claim 17, further comprising:
firing the cluster for a number of times;
correlating first and second time delays variations with a time-break variation to determine which source element of the cluster has fired first; and
determining a delay of each source element in the cluster.

19. The method of claim 15, wherein the time delay is corrected with a travel time of an acoustic wave that propagates from (i) the given individual source to (ii) a corresponding near-field sensor.

* * * * *